United States Patent
Nakamura et al.

(10) Patent No.: US 10,192,699 B2
(45) Date of Patent: Jan. 29, 2019

(54) POWER SEAT OPERATION DEVICE AND POWER SEAT

(71) Applicant: NHK SPRING CO., LTD., Yokohama-shi (JP)

(72) Inventors: Takeshi Nakamura, Yokohama (JP); Kenichi Katsube, Yokohama (JP); Souichi Nakayama, Yokohama (JP); Takenori Takashima, Kawasaki (JP); Satoshi Myojin, Kawasaki (JP); Tomonori Tanabe, Kawasaki (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 15/735,926

(22) PCT Filed: Jun. 1, 2016

(86) PCT No.: PCT/JP2016/066306
§ 371 (c)(1),
(2) Date: Dec. 12, 2017

(87) PCT Pub. No.: WO2016/203963
PCT Pub. Date: Dec. 22, 2016

(65) Prior Publication Data
US 2018/0190450 A1    Jul. 5, 2018

(30) Foreign Application Priority Data
Jun. 16, 2015    (JP) ................... 2015-121193

(51) Int. Cl.
*H01H 19/46*    (2006.01)
*H01H 19/06*    (2006.01)
(Continued)

(52) U.S. Cl.
CPC ............ *H01H 19/06* (2013.01); *B60N 2/02* (2013.01); *B60N 2/0228* (2013.01); *B60N 2/90* (2018.02);
(Continued)

(58) Field of Classification Search
CPC ............ H01H 2223/004; H01H 25/00; H01H 2019/143; H01H 2221/082;
(Continued)

(56) References Cited

U.S. PATENT DOCUMENTS 5,117,074 A * 5/1992 Yanai ................. H01H 9/04
                                                              200/302.1
8,674,245 B2 * 3/2014 Komatsu ............ B60N 2/0228
                                                              200/18

(Continued)

FOREIGN PATENT DOCUMENTS

| CN | 107430952 A | 12/2017 |
|----|-------------|---------|
| JP | A H09-022642 | 1/1997 |

(Continued)

OTHER PUBLICATIONS

International Search Report and Written Opinion of PCT/JP2016/066306 dated Aug. 16, 2016.
(Continued)

*Primary Examiner* — Felix O Figueroa
(74) *Attorney, Agent, or Firm* — Knobbe, Martens, Olson & Bear, LLP

(57) ABSTRACT

In a power seat operation device, a micro switch is attached inside a dial that is rotatably provided to a side face of a power seat. An opening is formed inside the dial, with an operation portion of a knob to operate the micro switch inserted through the opening. There is accordingly a possibility that liquid might infiltrate into the dial, however a channel is formed inside the dial by the dial and the knob.

(Continued)

The channel lets liquid flow downward to the lower side of the micro switch so as to discharge the liquid to outside the dial in cases in which liquid has infiltrated into the dial through the opening in a state in which the opening is positioned at the upper side of the micro switch. The channel is partitioned from the micro switch, enabling flow of liquid to the micro switch to be prevented or suppressed.

7 Claims, 22 Drawing Sheets

(51) Int. Cl.
*B60N 2/02* (2006.01)
*H01H 19/00* (2006.01)
*H01H 25/00* (2006.01)
*H01H 89/00* (2006.01)
*B60N 2/90* (2018.01)
*H01H 19/14* (2006.01)
*H01R 13/70* (2006.01)
*H01H 19/20* (2006.01)

(52) U.S. Cl.
CPC ............ *H01H 19/00* (2013.01); *H01H 19/14* (2013.01); *H01H 19/46* (2013.01); *H01H 25/00* (2013.01); *H01H 89/00* (2013.01); *H01R 13/701* (2013.01); *H01H 19/20* (2013.01); *H01H 2019/143* (2013.01); *H01H 2019/146* (2013.01); *H01H 2221/062* (2013.01); *H01H 2221/082* (2013.01); *H01H 2223/004* (2013.01); *H01H 2231/026* (2013.01); *H01H 2300/008* (2013.01)

(58) Field of Classification Search
CPC ....... H01H 2231/026; H01H 2300/008; H01H 19/06; H01H 25/065; B60N 2/0228
See application file for complete search history.

(56) References Cited

U.S. PATENT DOCUMENTS

| | | | |
|---|---|---|---|
| 9,446,690 B2* | 9/2016 | Shigematsu | B60N 2/995 |
| 2018/0111507 A1* | 4/2018 | Nakamura | B60N 2/0228 |
| 2018/0111508 A1* | 4/2018 | Nakamura | B60N 2/90 |

FOREIGN PATENT DOCUMENTS

| | | |
|---|---|---|
| JP | A 2012-146429 | 8/2012 |
| JP | A 2014-201267 | 10/2014 |

OTHER PUBLICATIONS

Chinese Office Action dated Oct. 12, 2018 in Chinese Application No. 201680034099.4 in 11 pages (English translation included).

* cited by examiner

POWER SEAT OPERATION DEVICE AND POWER SEAT

CROSS-REFERENCE TO RELATED APPLICATIONS

This application is the U.S. National Phase under 35. U.S.C. § 371 of International Application PCT/JP2016/066306, filed Jun. 1, 2016, which claims priority to Japanese Patent Application No. 2015-121193, filed Jun. 16, 2015. The disclosures of the above-described applications are hereby incorporated by reference in their entirety.

TECHNICAL FIELD

The present invention relates to a power seat and an operation device for operating plural moving mechanisms provided to a power seat.

BACKGROUND ART

Japanese Patent Application Laid-Open (JP-A) No. H09-22642 describes a multidirectional changeover switch that is employed as a power seat switch in automobiles. In this multidirectional changeover switch, a rotary circuit board and a sliding circuit board are fixed to a board attachment member attached to the inside of a housing. An opening is formed in the housing, and a return spring and a rotation spring are inserted into the opening. The return spring couples a switch knob disposed outside the housing to the board attachment member, and the rotation spring couples the switch knob to a rotation shaft supported by the board attachment member. Configuration is such that contacts on the sliding circuit board are switched ON/OFF when the switch knob is slid with respect to the housing, and contacts on the rotary circuit board are switched ON/OFF when the switch knob is rotated with respect to the housing.

SUMMARY OF INVENTION

Technical Problem

In the multidirectional changeover switch (power seat operation device) configured as described above, in cases in which a liquid, such as rainwater or a beverage, splashes on the housing, there is a possibility that the liquid might flow to a contact section (switch) on a circuit board in the housing and a malfunction, shorting, etc. occur.

In consideration of the above circumstances, an object of the present invention is to obtain a power seat operation device and a power seat in which the flow of liquid to a switch can be prevented or suppressed.

Solution to Problem

A power seat operation device according to a first aspect of the present invention includes a dial, a switch, a knob, and a channel. The dial is rotatably installed at a side face of a power seat provided with plural moving mechanisms, one of the plural moving mechanisms being selected by rotational operation of the dial, and an interior and an exterior of the dial being in communication through an opening formed at a peripheral outer side of the dial. The switch is attached inside the dial and actuates the selected moving mechanism. The knob is installed inside the dial at a seat width direction outer side of the switch, is rotatably supported by the dial, includes an operation portion inserted through the opening so as to project outside the dial, and is capable of operating the switch by operation of the operation portion. The channel is formed inside the dial by the dial and the knob and is partitioned from the switch. In cases in which liquid has infiltrated into the dial through the opening in a state in which the opening is positioned at an upper side of the switch, the channel letting the liquid flow downward to a lower side of the switch so as to discharge the liquid to outside the dial.

In the power seat operation device of the first aspect, the switch is attached inside the dial rotatably installed to the side face of a power seat. Moreover, the knob is installed inside the dial at the seat width direction outer side of the switch. The knob is rotatably supported by the dial, and the operation portion provided to the knob is inserted through the opening formed in the peripheral outer side of the dial and projects outside the dial. One of the plural moving mechanisms provided to the power seat is selected when the dial is rotationally operated. Then, when the operation portion of the knob is operated, the switch inside the dial is operated, and the selected moving mechanism is actuated.

In the present invention, the channel is formed inside the dial by the dial and the knob as described above. The channel lets liquid flow downward to the lower side of the switch so as to be discharged to outside the dial in cases in which liquid has infiltrated inside the dial through the opening in a state in which the opening of the dial is positioned at the upper side of the switch. The channel is partitioned from the switch, and so flow of liquid to the switch can be prevented or suppressed.

A power seat operation device of a second aspect of the present invention is the first aspect, wherein at least one of the dial or the knob includes a reinforcement rib inside the dial that projects in a seat width direction, and the channel is formed using the reinforcement rib.

In the power seat operation device of the second aspect, at least one out of the dial or the knob includes a reinforcement rib such as described above. This reinforcement rib is used to form the channel inside the dial. This enables a more rationalized configuration to be achieved compared to cases in which a dedicated rib is set to form the channel.

A power seat operation device of a third aspect of the present invention is the second aspect, wherein the knob includes a pair of knob reinforcement ribs to serve as the reinforcement rib that projects toward the seat width direction outside, the pair of knob reinforcement ribs extend from an operation portion side of the knob toward an opposite side from the operation portion, and the channel includes an outer channel that is formed using the pair of knob reinforcement ribs between a wall portion at a seat width direction outer side of the dial and the knob.

In the power seat operation device of the third aspect, the knob installed inside the dial at the seat width direction outer side of the switch includes the pair of knob reinforcement ribs that project toward the seat width direction outer side. This pair of knob reinforcement ribs extend on the knob from the side of the operation portion inserted through the opening in the dial to the opposite side to the operation portion. The pair of knob reinforcement ribs is used to form the outer channel between the wall portion on the seat width direction outer side of the dial and the knob. Thereby, in cases in which liquid has infiltrated inside the dial through the opening of the dial as described above, and flowed between the seat width direction outer side wall portion of the dial and the knob, the channel including the outer channel as described above is able to let the liquid flow downward to the lower side of the switch so as to be discharged to outside the dial.

A power seat operation device of a fourth aspect of the present invention is the third aspect, wherein the knob includes a pair of stoppers that face each other in their own rotation direction across the operation portion, the pair of stoppers abutting the dial so as to restrict a rotation range with respect to the dial, and the pair of stoppers guiding to the outer channel any liquid that has infiltrated into the dial through the opening.

In the power seat operation device of the fourth aspect, the rotation range of the knob with respect to the dial is restricted by the pair of stoppers provided to the knob abutting the dial. Moreover, liquid that has infiltrated into the dial through the opening as described above is guided to the outer channel by the pair of stoppers. Namely, configuration to restrict the rotation range of the knob with respect to the dial also doubles as configuration to prevent or suppress flow of liquid to the switch. This enables an even more rationalized configuration to be achieved.

A power seat operation device of a fifth aspect of the present invention is any one aspect of the second to the fourth aspects, wherein the dial includes a dial reinforcement rib between the opening and the switch to serve as the reinforcement rib that projects from a wall portion at a seat width direction inner side toward a seat width direction outer side, and the channel includes an inner channel that is formed using the dial reinforcement rib between the seat width direction inner side wall portion of the dial and the knob.

In the power seat operation device of the fifth aspect, inside the dial, the dial reinforcement rib that projects from the seat width direction inner side wall portion of the dial toward the seat width direction outer side is interposed between the opening of the dial and the switch. The dial reinforcement rib is then used to form the inner channel between the seat width direction inner side wall portion of the dial and the knob. Thereby, in cases in which liquid has infiltrated into the dial through the opening in the dial as described above and flowed between the seat width direction inner side wall portion of the dial and the knob, the liquid can be let to flow downward to the lower side of the switch so as to be discharged to outside the dial by the channel including the inner channel.

A power seat operation device of a sixth aspect of the present invention is the fifth aspect, wherein the dial reinforcement rib extends along a radial direction of the dial from one portion to another portion at an outer periphery of the dial, and forms a convex shape on an opening side at a radial direction central side of the dial.

In the power seat operation device of the sixth aspect, the dial reinforcement rib is formed as described above, and so liquid that had flowed between the seat width direction inner side wall portion of the dial and the knob as described above can be caused by the dial reinforcement rib to flow to a portion at one side and a portion at the other side of the outer periphery of the dial. Namely the liquid can be split between a path flowing toward one outer peripheral portion side of the dial and a path flowing toward another outer peripheral portion side of the dial, thereby enabling a configuration in which liquid does not become over-concentrated in any one path in cases in which, for example, there is a large amount of the liquid described above.

A power seat of a seventh aspect of the present invention includes a seat body provided with the plurality of moving mechanisms, and the power seat operation device according to any one aspect of the first to the sixth aspects, with the dial being rotatably installed to a side face of the seat body.

In the power seat of the seventh aspect, the dial of the power seat operation device is rotatably installed to the side face of the seat body provided with the plural moving mechanisms. This power seat operation device is as described in any one aspect of the first aspect to the sixth aspect, and so is able to obtain the advantageous effects described above.

Advantageous Effects of Invention

As described above, in a power seat operation device and a power seat according to the present invention, flow of liquid to the switch can be prevented or suppressed.

DESCRIPTION OF EMBODIMENTS

Explanation follows regarding a power seat operation device 10 and a power seat 12 according to an exemplary embodiment of the present invention, with reference to FIG. 1 to FIG. 23. Note that in each of the drawings, the arrow FR indicates the vehicle front direction, the arrow UP indicates the vehicle upper direction, and the arrow OUT indicates outward in the vehicle width direction, as appropriate. In the present exemplary embodiment, the front, rear, up, and down directions, and the width direction (left-right direction), of the power seat 12 respectively correspond to the front, rear, up, and down directions, and the width direction (left-right direction), of the vehicle.

Overall Schematic Configuration of Power Seat 12

Figure 1:
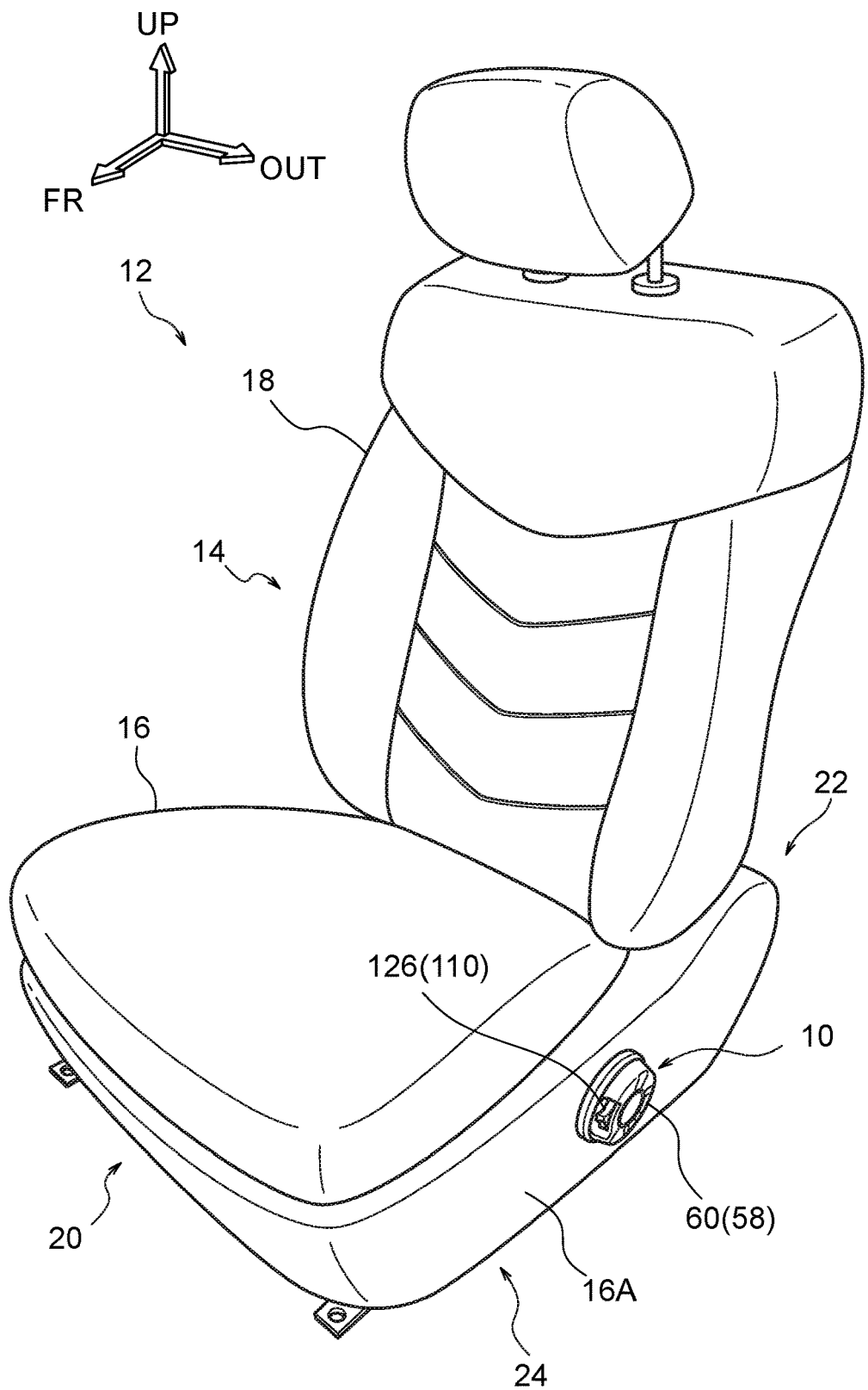
FIG. 1 is a perspective view of a power seat according to an exemplary embodiment of the present invention.

As illustrated in FIG. 1, the power seat 12 according to the present exemplary embodiment includes a seat body 14. The seat body 14 includes a seat slide mechanism 20 that slides a seat cushion 16 along a seat front-rear direction with respect to a non-illustrated vehicle body floor, a recliner mechanism 22 that swings a seat back 18 with respect to the seat cushion 16, and a lifter mechanism 24 that moves the seat cushion 16 in the up-down direction with respect to the vehicle body floor. Each of these mechanisms is a moving mechanism.

The power seat 12 also includes the power seat operation device 10, which is installed to a side face 16A on the vehicle width direction outside of the seat cushion 16. The power seat operation device 10 is a seat switch device for selectively actuating the seat slide mechanism 20, the recliner mechanism 22, or the lifter mechanism 24. The power seat operation device 10 is attached to the seat cushion 16 through a multi-shaft drive device 26 (see FIG. 2 to FIG. 5) installed inside the seat cushion 16.

The multi-shaft drive device 26 utilizes the driving force from a single non-illustrated motor to selectively drive the seat slide mechanism 20, the recliner mechanism 22, or the lifter mechanism 24. The multi-shaft drive device 26 configures a portion of the seat body 14. The multi-shaft drive device 26 is, for example, configured as described in International Publication (WO) No. 2012/077759, and is configured such the mechanical coupling state between the motor and each of the above moving mechanisms can be selectively switched by operation of the power seat operation device 10.

Power Seat Operation Device 10 Configuration

As illustrated in FIG. 2 to FIG. 8, relevant portions of the power seat operation device 10 include a dial base 32 attached to the seat body 14, a dial 58 that is supported so as to be capable of rotational operation with respect to the dial base 32, a slider 78 that is supported so as to slidable with respect to the dial 58, a micro switch 94 that is attached to the dial 58, and a knob 110 that is supported so as to be capable of rotational operation with respect to the dial 58. The dial base 32 is formed in a circular disc shape, and is disposed at the seat width direction outside of the multi-shaft drive device 26 in an orientation in which its axial direction is aligned in the seat width direction. A circular through hole 34 is formed in a central portion of the dial base 32.

Figure 6:
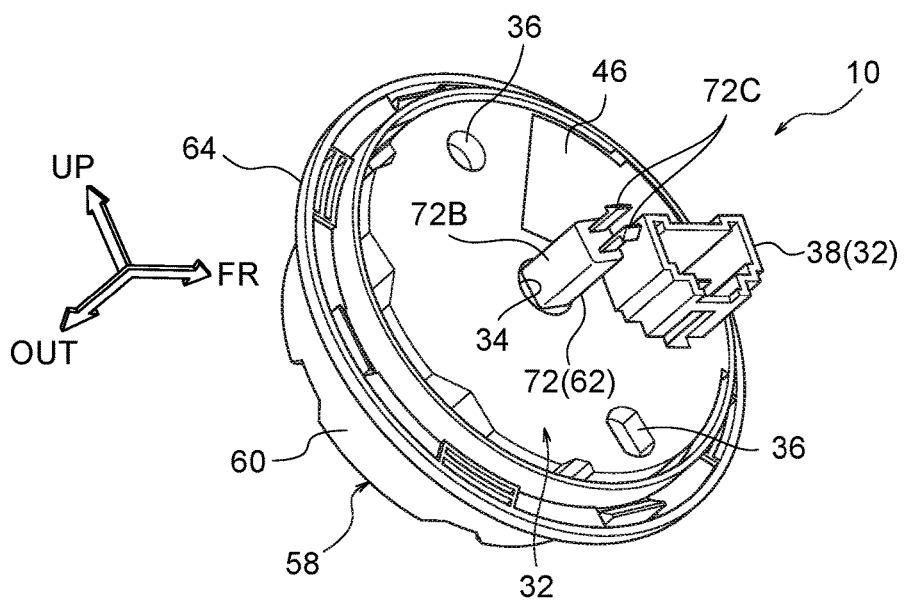
FIG. 6 is a perspective view of a power seat operation device as viewed from a back-face side.
Figure 8:
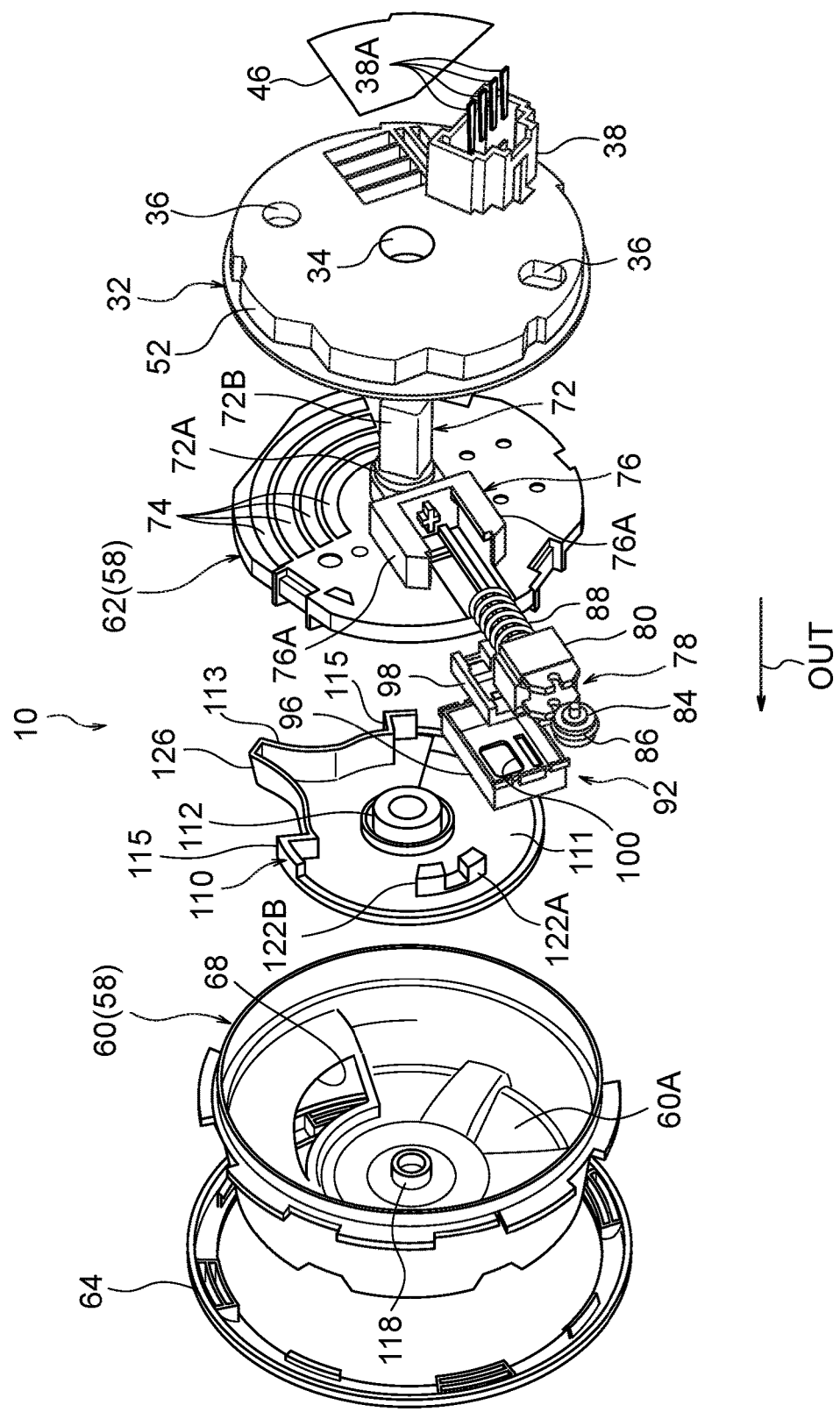
FIG. 8 is an exploded perspective view of a power seat operation device as viewed from a back-face side.

As illustrated in FIG. 6 and FIG. 8, a pair of recesses 36 are formed in a seat width direction inside face (the face on the multi-shaft drive device 26 side) of the dial base 32. The recesses 36 are positioned on opposite sides of the through hole 34. A pair of protrusions 28 (see FIG. 5) that fit into the recesses 36 are provided to the multi-shaft drive device 26. Relative rotation of the dial base 32 with respect to the multi-shaft drive device 26 is restricted thereby. Note that the dial base 32 is configured such that axial direction movement with respect to the multi-shaft drive device 26 is restricted by a switch base 62, described below, thus fixing the dial base 32 to the multi-shaft drive device 26 so as to be incapable of relative movement with respect to the multi-shaft drive device 26.

A connector portion 38 is formed projecting from the seat width direction inside face of the dial base 32 toward the seat width direction inside. Configuration is such that a non-illustrated connector, which is attached to a harness connected to the motor mentioned above, is connected to the connector portion 38. Thus, due to providing the connector portion 38 to the dial base 32 that is fixed to the multi-shaft drive device 26, namely to the seat body 14, configuration is such that bending force is not input to the harness of the motor by rotational operation of the dial 58.

Figure 7:
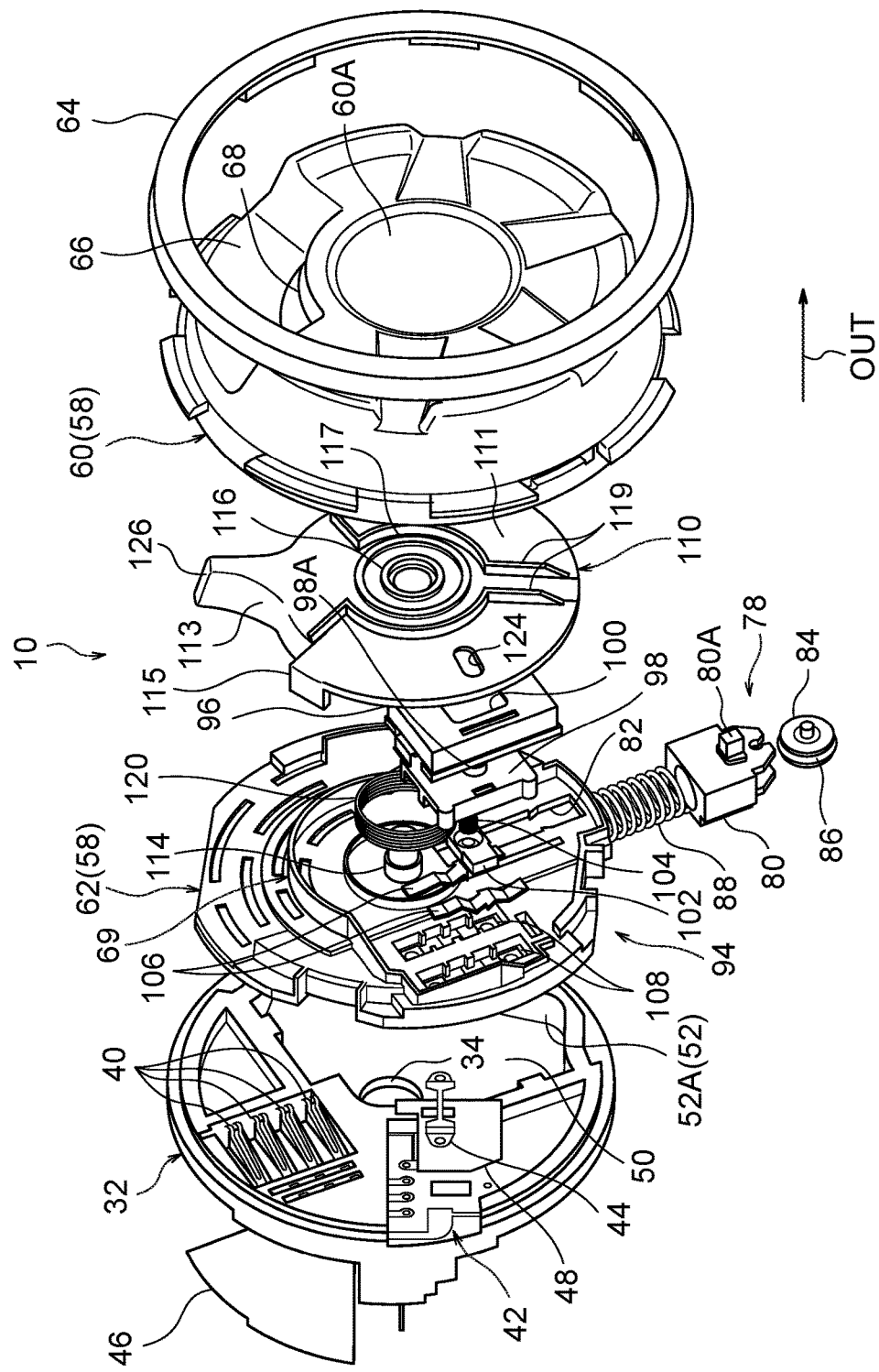
FIG. 7 is an exploded perspective view of a power seat operation device as viewed from a front-face side.
Figure 9:
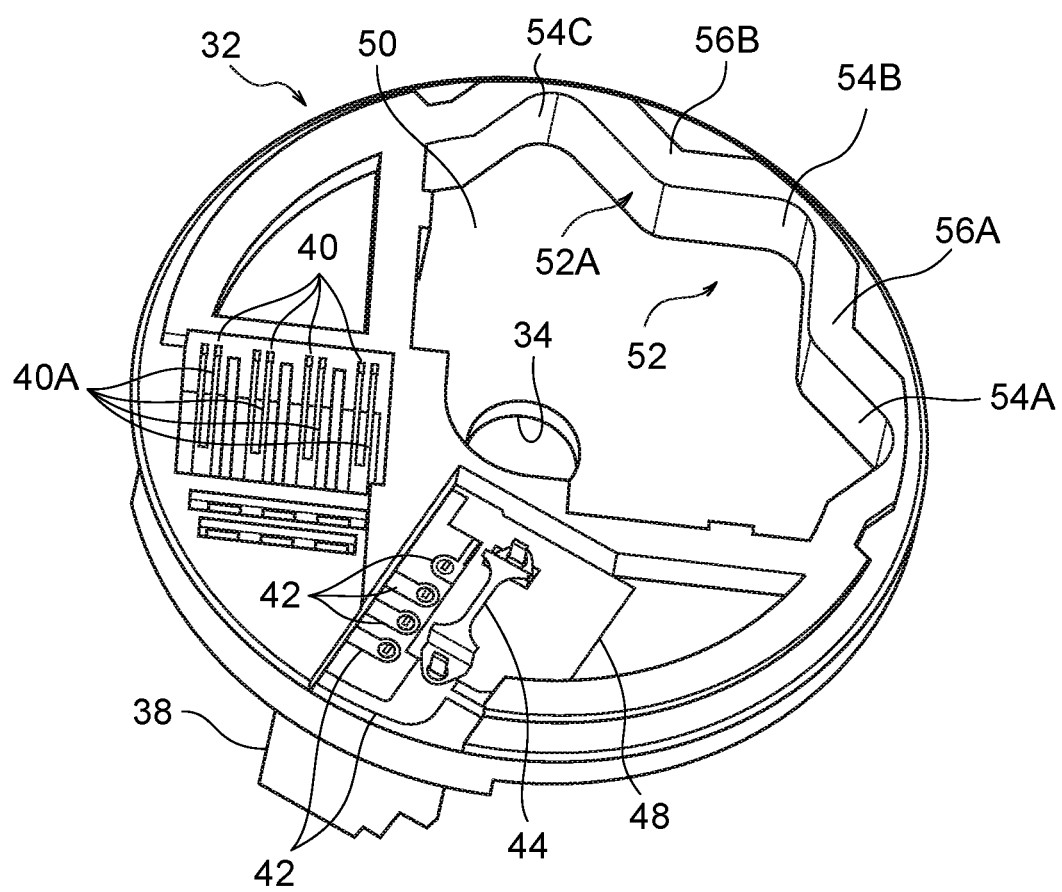
FIG. 9 is a perspective view of peripheral members of a power seat operation device, including a dial base, which is a configuration member of the power seat operation device.

As illustrated in FIG. 7 and FIG. 9, plural (herein, four) dial base contact terminals 40 are attached to one radial direction side of a seat width direction outside face of the dial base 32. The plural dial base contact terminals 40 are formed in elongated shapes having their length directions along the circumferential direction of the dial base 32, and are side-by-side in the radial direction of the dial base 32. The plural dial base contact terminals 40 are electrically connected through a wiring pattern 42 to plural connector terminals 38A provided to the connector portion 38 (see FIG. 8). A fusible link plate 44 is attached partway along the wiring pattern 42. Note that the members appended with reference numerals 46 and 48 in FIG. 7, FIG. 9, etc., are insulating seals.

In addition, a recess 50 of substantially folding-fan shape, as viewed along the axial direction of the dial base 32, is formed to one radial direction side of the seat width direction outside face of the dial base 32. The recess 50 is formed such that a dimension thereof along the circumferential direction of the dial base 32 increases on progression from the central side of the dial base 32, where the through hole 34 is formed, toward a peripheral outside of the dial base 32. A cam portion 52 that has an undulating shape is formed in the recess 50 at an outer peripheral portion of the dial base 32. In the cam portion 52, plural (herein, three) valleys 54A, 54B, 54C and plural (herein, two) peaks 56A, 56B are formed alternately arranged in a row along the circumferential direction (the rotation direction of the dial 58) of the dial base 32 so as to form undulations in the radial direction of the dial base 32. An undulating face 52A of the cam portion 52 faces toward the radial direction center of the dial base 32 and the dial 58.

The valleys 54A, 54B, 54C and the peaks 56A, 56B are formed in substantially triangular shapes as viewed along the axial direction of the dial base 32, thus configuring the cam portion 52 of substantially wave shape. The valleys 54A, 54B, 54C dip in toward the radial direction outside (peripheral outside) of the dial base 32. A dimension of the valleys 54A, 54B, 54C along the circumferential direction of the dial base 32 (a width dimension along the rotation direction of the dial 58) decreases on progression toward the radial direction outside of the dial base 32. The peaks 56A, 56B project toward the radial direction center (central side) of the dial base 32. A dimension of the peaks 56A, 56B along the circumferential direction of the dial base 32 (a width dimension along the rotation direction of the dial 58) decreases on progression toward the radial direction center of the dial base 32. The bottoms of the valleys 54A, 54B, 54C and the apexes of the peaks 56A, 56B are each curved in a circular arc shape, as viewed along the axial direction of the dial base 32.

Figure 10:
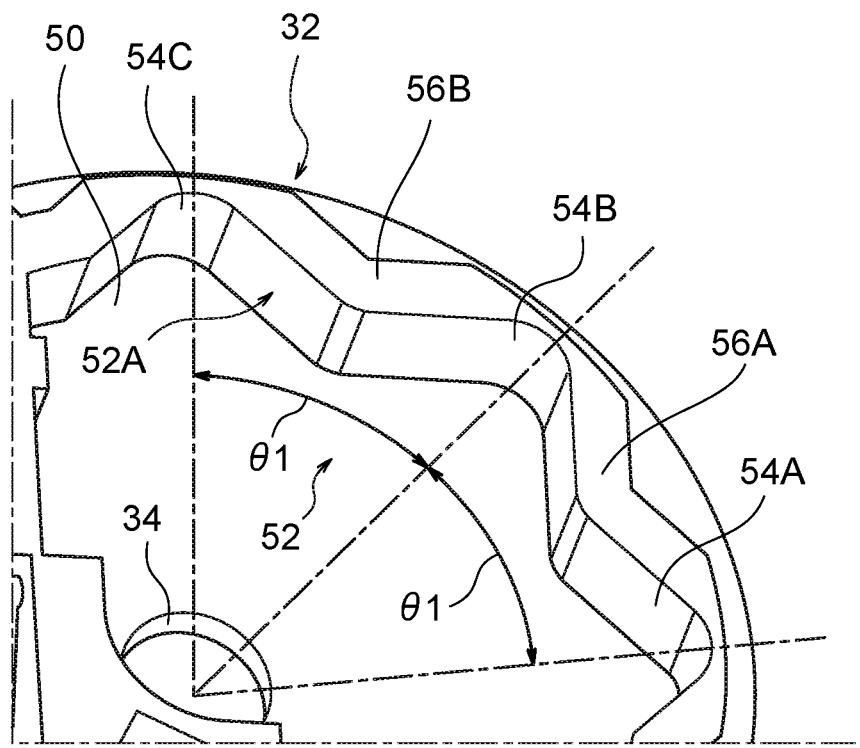
FIG. 10 is an enlarged perspective view in which a portion of FIG. 9 has been enlarged.

In the present exemplary embodiment, the valleys 54A, 54B, 54C are arranged in a row along the circumferential direction of the dial base 32 at a pitch of 45° about the center of the dial base 32, with θ1 illustrated in FIG. 10 set to 45°. Note that in the following explanation, the valleys 54A, 54B, 54C are sometimes referred to as valleys 54, and the peaks 56A, 56B are sometimes referred to as peaks 56. The dial 58 is installed so as to be capable of rotating at the seat width direction outside of the dial base 32 configured as described above.

As illustrated in FIG. 7 and FIG. 8, the dial 58 is configured by a dial body 60 and a switch base 62. The dial body 60 is formed in a bottomed, substantially cylindrical shape that is open toward the seat width direction inside (at the dial base 32 side). The dial body 60 is disposed coaxially to the dial base 32, in an orientation in which its axial direction runs along the seat width direction and in which its opening faces the seat width direction inside. The dial base 32 is disposed inside the dial body 60, and a ring shaped cover 64 is mounted to an outer peripheral portion of the dial body 60. A recess 66, which is substantially trapezoid shaped as viewed along the axial direction of the dial 58, is formed in part of the peripheral outside of the dial body 60. The recess 66 is open at the radial direction outside and the seat width direction outside of the dial 58. A substantially rectangular shaped opening 68 that is open in the radial direction of the dial body 60 is formed in the recess 66.

The switch base 62 includes a single integrated unit of a base body 63 formed in a substantially circular disc and a peripheral wall portion 65 that projects toward the seat width direction outside from the outer periphery of the base body 63. The peripheral wall portion 65 is formed in a substantially C-shape as viewed along the axial direction of the base body 63, and omits part of the outer peripheral portion of the base body 63. An operation portion placement region 67 for disposing an operation portion 126 of the knob 110, described below, is thus formed at this part of the outer peripheral portion of the switch base 62. The switch base 62 is disposed between the dial body 60 and the dial base 32 and fits inside the dial body 60. Plural hooks are formed at an inner peripheral portion of the dial body 60, and these hooks hook onto outer peripheral portions of the switch base 62. Thereby, the switch base 62 is coaxially and integrally attached to the dial body 60.

Figure 11:
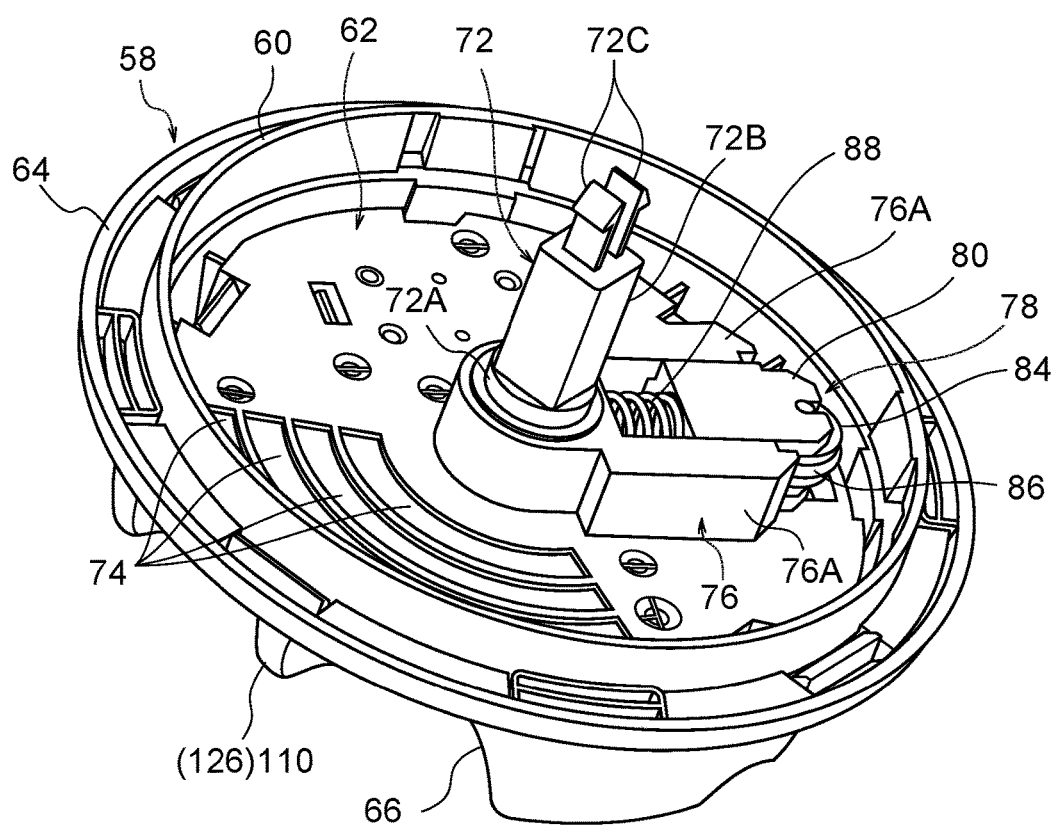
FIG. 11 is a perspective view of peripheral members of a power seat operation device, including a dial and a slider, which are configuration members of the power seat operation device.
Figure 12:
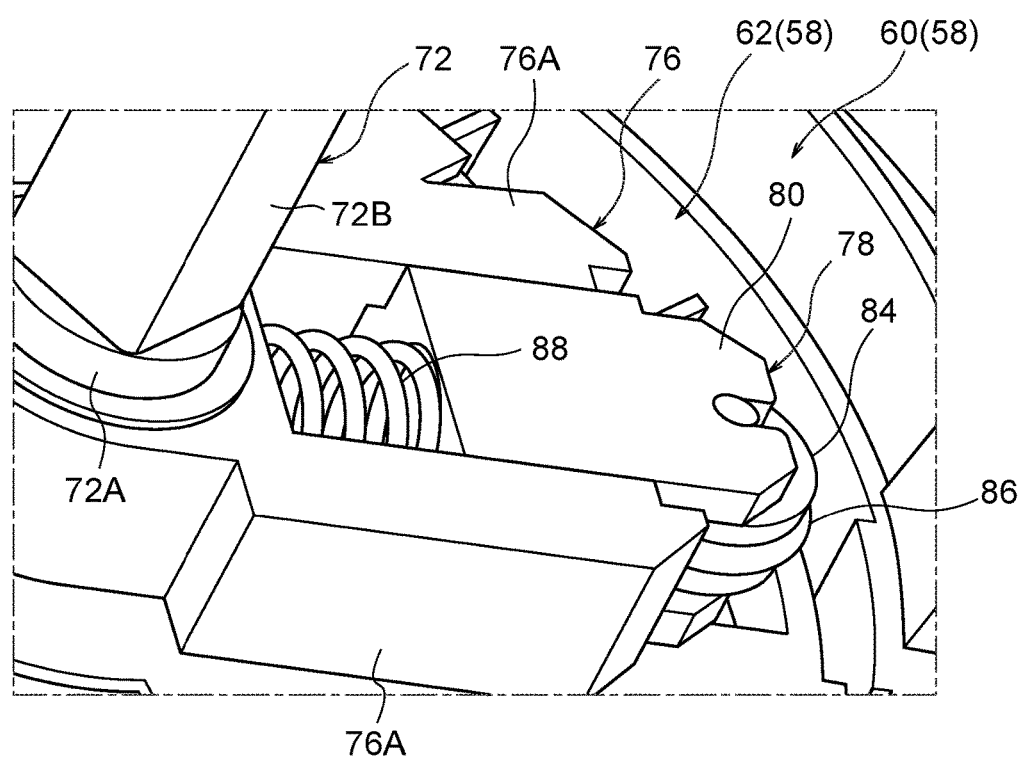
FIG. 12 is an enlarged perspective view in which a portion of FIG. 11 has been enlarged.

As illustrated in FIG. 8 and FIG. 11, a coupling shaft 72 that projects toward the seat width direction inside is coaxially formed at a central portion of the switch base 62. A base end portion of the coupling shaft 72 is disposed inside the recess 50 of the dial base 32. A support shaft portion 72A formed in a circular column shape is provided at the base end side of the coupling shaft 72. The support shaft portion 72A rotatably fits into the through hole 34 of the dial base 32. The switch base 62, namely the dial 58, is thereby rotatably supported with respect to the dial base 32. Further, an angular column portion 72B formed in an angular column shape is provided further toward a leading end side of the coupling shaft 72 than the support shaft portion 72A, and a pair of hooks 72C are provided projecting from a leading end of the angular column portion 72B.

The angular column portion 72B projects further toward the seat width direction inside than the dial base 32, and corresponds to an operation shaft 30 (see FIG. 5) included in the multi-shaft drive device 26 described above. A coupling hole 30A, which is square shaped as viewed along the seat width direction, is formed in the operation shaft 30. The angular column portion 72B is inserted into the coupling hole 30A mentioned above, and the pair of hooks 72C hook onto the operation shaft 30 from the inner side of the coupling hole 30A. The power seat operation device 10 is thereby coupled to the multi-shaft drive device 26 so as to be incapable of relative movement in the axial direction. Further, the switch base 62 is coupled to the operation shaft 30 so as to be incapable of relative movement in the axial direction and so as to be rotatable as a unit together with the operation shaft 30. Configuration is such that the multi-shaft drive device 26 switches the mechanical coupling state between the motor and each of the above moving mechanisms by manual rotational operation of the dial 58.

Specifically, the dial 58 is rotationally operable with respect to the dial base 32, namely with respect to the seat body 14, between plural rotation positions. These positions are a slide operation position (the position illustrated in FIG. 2), a recliner operation position (the position illustrated in FIG. 3), and a lifter operation position (the position illustrated in FIG. 4). The motor and the seat slide mechanism 20 are mechanically coupled in a state in which the dial 58 is positioned at the slide operation position. The motor and the recliner mechanism 22 are mechanically coupled in a state in which the dial 58 is positioned at the recliner operation position. The motor and the lifter mechanism 24 are mechanically coupled in a state in which the dial 58 is positioned at the lifter operation position. Note that 45° is set in the present exemplary embodiment for both the angle of rotation of the dial 58 between the slide operation position and the recliner operation position, and the angle of rotation of the dial 58 between the recliner operation position and the lifter operation position.

As illustrated in FIG. 8, plural (herein, four) terminals 74 are attached to one radial direction side of the seat width direction inside face (the face on the dial base 32 side) of the switch base 62. The plural terminals 74 are curved in circular arc shapes concentric to the switch base 62, and are disposed side-by-side in the radial direction of the switch base 62. The plural terminals 74 are in constant slidable contact with the plural dial base contact terminals 40 described above, such that the plural terminals 74 and the plural dial base contact terminals 40 are electrically connected together.

Note that the plural dial base contact terminals 40 are each split into a bifurcated shape by grooves 40A (see FIG. 9: these reference numerals are omitted outside of FIG. 9) formed at width direction central portions of the dial base contact terminals 40. Thus, configuration is such that any abraded powder produced by the terminals 74 sliding against the dial base contact terminals 40 escapes via the width direction central portions of the dial base contact terminals 40, thereby stabilizing the contact between the terminals 74 and the dial base contact terminals 40.

Further, a slider support portion 76 is formed at the other radial direction side of the seat width direction inside face (the face on the dial base 32 side) of the switch base 62. The slider support portion 76 includes a pair of side-wall portions 76A (see FIG. 11 and FIG. 12) that project toward the dial base 32 side. The pair of side-wall portions 76A face each other along the circumferential direction of the switch base 62, and are integrally configured to the base end portion of the coupling shaft 72 described above at the central side of the switch base 62. The slider support portion 76 is disposed inside the recess 50 of the dial base 32 and supports a slider 78.

The slider 78 is formed in a substantial block shape and includes a body portion 80 fitted between the pair of side-wall portions 76A. The body portion 80 is supported by the pair of side-wall portions 76A so as to be slidable in the radial direction of the switch base 62 and so as not to fall out in the axial direction of the switch base 62. As illustrated in FIG. 7, an angular column shaped knob engagement portion (protrusion) 80A that projects toward the switch base 62 side (the seat width direction outside) is formed to the body portion 80. The knob engagement portion 80A is inserted into a rectangular through hole 82 formed in the switch base 62, and projects to the seat width direction outside of the switch base 62. The through hole 82 extends along the radial direction of the switch base 62, and is formed so as to permit sliding of the body portion 80 with respect to the switch base 62.

A roller 84 is attached to a leading end portion of the body portion 80 (a radial direction outside end portion of the dial 58). The roller 84 is supported so as to be capable of rotating with respect to the slider 78 about an axis running along the seat width direction. A sound-damping rubber ring 86 (reference numeral omitted in FIG. 13A to FIG. 13F) that has been formed from rubber into a ring shape is mounted to an outer peripheral portion of the roller 84.

A roller spring 88 serving as an elastic member is installed between the pair of side-wall portions 76A and between the body portion 80 of the slider 78 and the base end portion of the coupling shaft 72. The roller spring 88 is a compression coil spring, and biases the slider 78 toward the radial direction outside of the dial 58. The roller 84 of the slider 78 thereby, through the rubber ring 86, elastically abuts (is pressed against) the undulating face 52A of the cam portion 52 described above. The slider 78 is configured so as to fit into one out of the plural valleys 54A, 54B, 54C such that the dial 58 is retained at one out of the plural rotation positions.

Specifically, the dial 58 is retained at the slide operation position (the position illustrated in FIG. 2) by the slider 78 fitting into the valley 54A. The dial 58 is retained at the recliner operation position (the position illustrated in FIG. 3) by fitting the slider 78 into the valley 54B. The dial 58 is retained at the lifter operation position (the position illustrated in FIG. 4) by the slider 78 fitting into the valley 54C.

When the dial 58 is rotationally operated, the roller 84 and the rubber ring 86 of the slider 78 roll over the undulating face 52A of the cam portion 52. The slider 78 then moves along the undulating face 52A of the cam portion 52 while elastically deforming the roller spring 88 and sliding in the radial direction with respect to the dial 58.

Figure 13A:
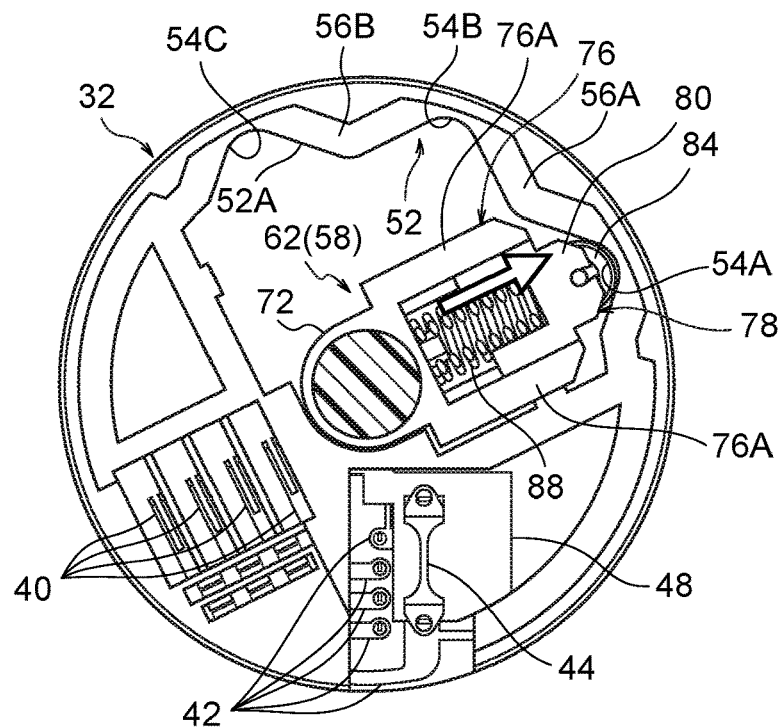
FIG. 13A is a partial cross-section for explaining a relationship of a dial and a slider with a cam portion of a dial base, and illustrates a state in which the dial is positioned at a slide operation position.
Figure 13B:
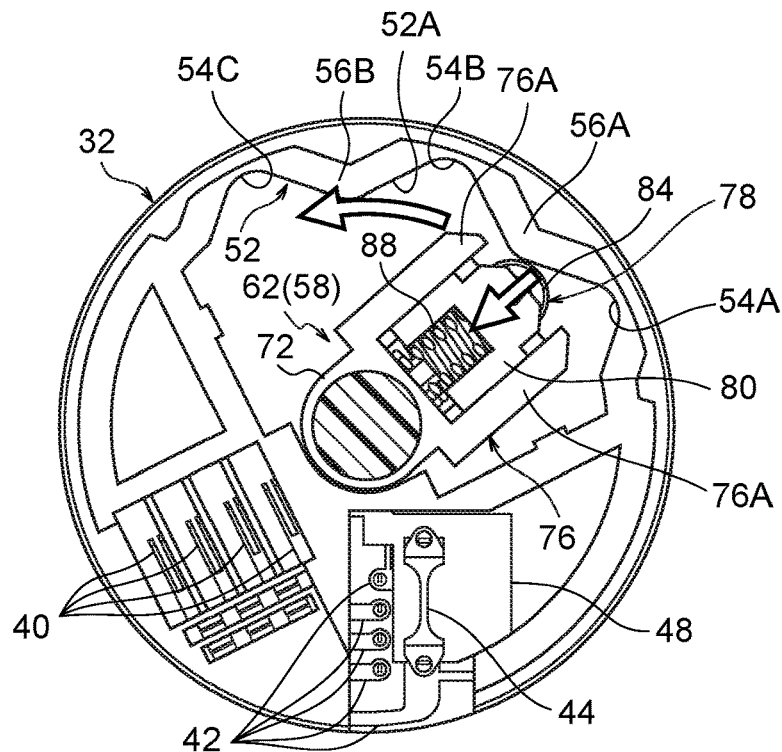
FIG. 13B is a partial cross-section corresponding to FIG. 13A and illustrating a state in which a dial is in partway through being rotationally operated from a slide operation position to a recliner operation position.

For example, from a state in which the slider 78 has been fitted into the valley 54A as illustrated in FIG. 13A, namely in a state in which the dial 58 is positioned at the slide operation position, when the dial 58 is rotationally operated from the slide operation position toward the recliner operation position, the roller 84 is pressed toward the radial direction center of the dial 58 by the inclined face of the peak 56A, as illustrated in FIG. 13B, such that the slider 78 slides toward the radial direction center of the dial 58 while the roller spring 88 compressively deforms.

Figure 13C:
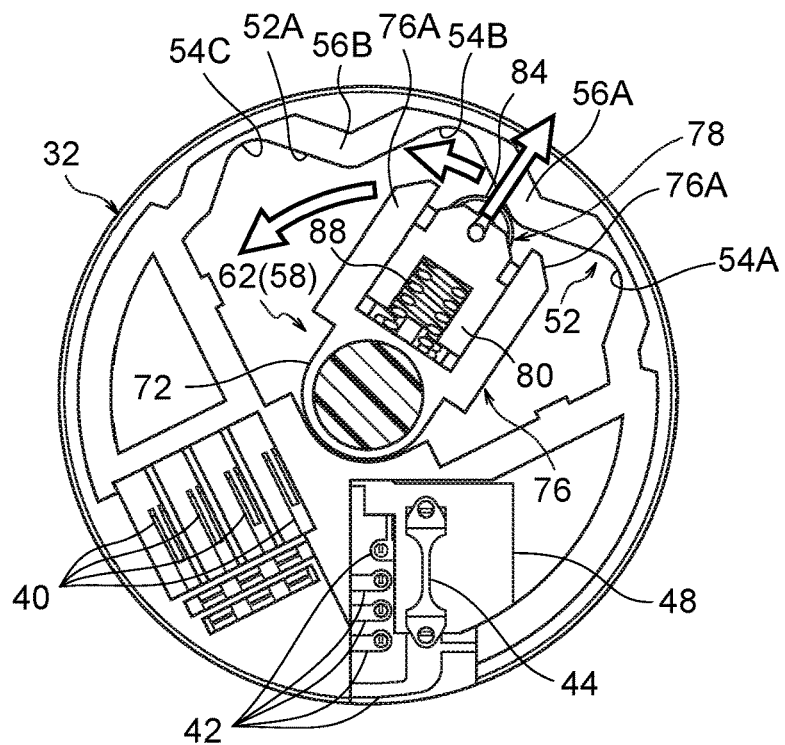
FIG. 13C is a partial cross-section corresponding to FIG. 13A for explaining a state when a dial moves automatically from a position partway between a recliner operation position and a slide operation position to the recliner operation position.

Then, when the roller 84 crosses the apex of the peak 56A as illustrated in FIG. 13C, the slider 78 moves toward the bottom side of the valley 54B while sliding toward the radial direction outside of the dial 58 due to elastic recovery force from the roller spring 88. The slider 78 thereby crosses over the peak 56A and fits inside the valley 54B. When this occurs, the production of noise is prevented due to the rubber ring 86 abutting the bottom of the valley 54B. This point similarly applies to when the slider 78 fits inside the valley 54A or the valley 54C.

As described above, the roller spring 88 undergoes compressive deformation when the slider 78 crosses over the peak 56A. Thus, in cases in which an operator rotationally operating the dial 58 has removed their hand from the dial 58 at a partway position (at an intermediate position) between the slide operation position and the recliner operation position, the slider 78 fits into the nearby valley 54A or valley 54B by elastic recovery force from the roller spring 88. The dial 58 is thus configured to automatically move to either the recliner operation position or the slide operation position, which are each one out of the plural rotation positions.

Figure 13D:
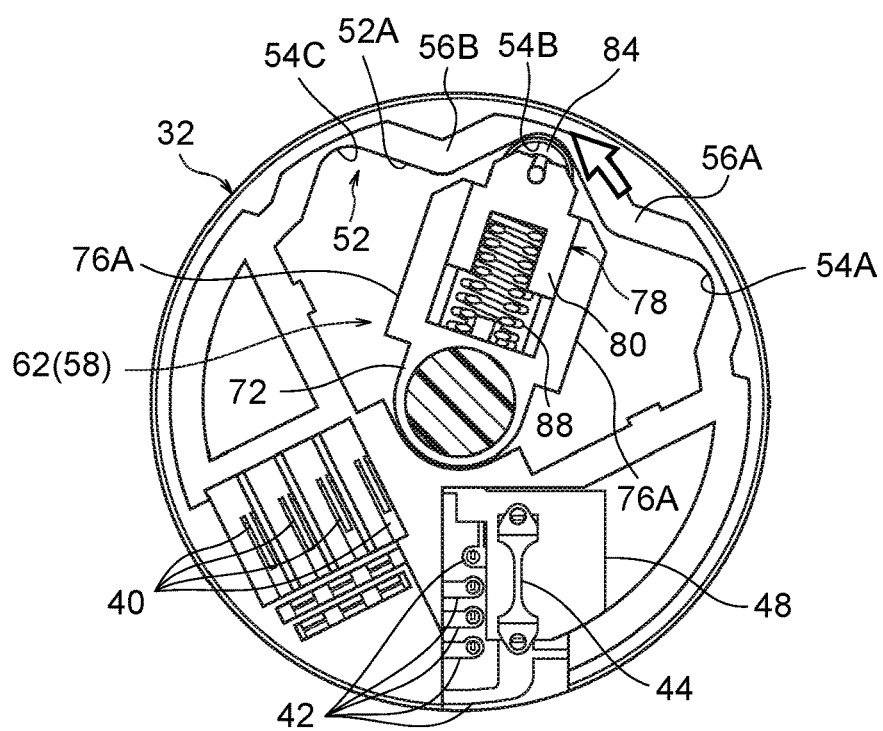
FIG. 13D is a partial cross-section corresponding to FIG. 13A and illustrating a state in which a dial has been moved to a recliner operation position.
Figure 13E:
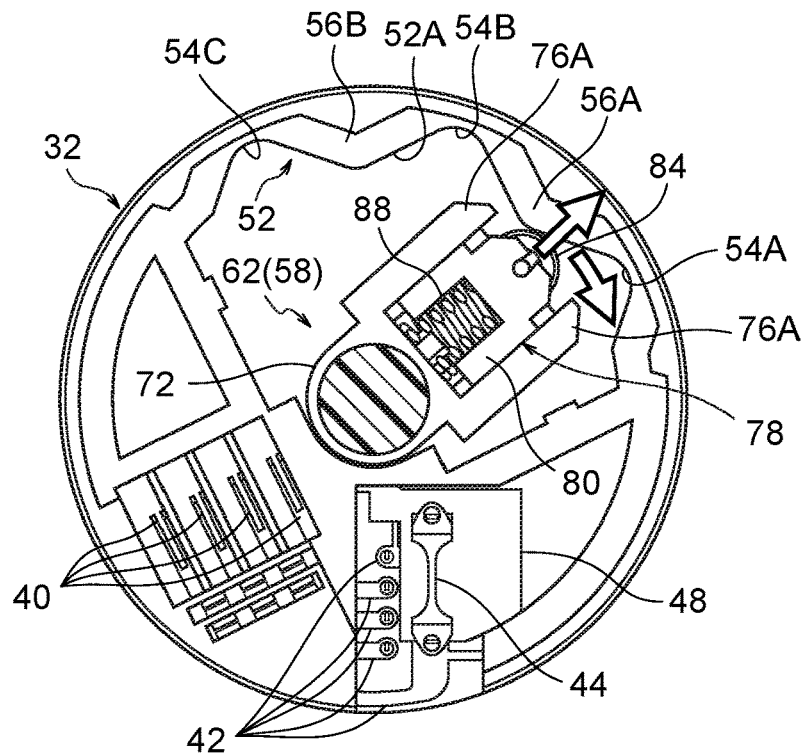
FIG. 13E is a partial cross-section corresponding to FIG. 13A for explaining a state when a dial moves automatically from a position partway between a recliner operation position and a slide operation position to the slide operation position.
Figure 13F:
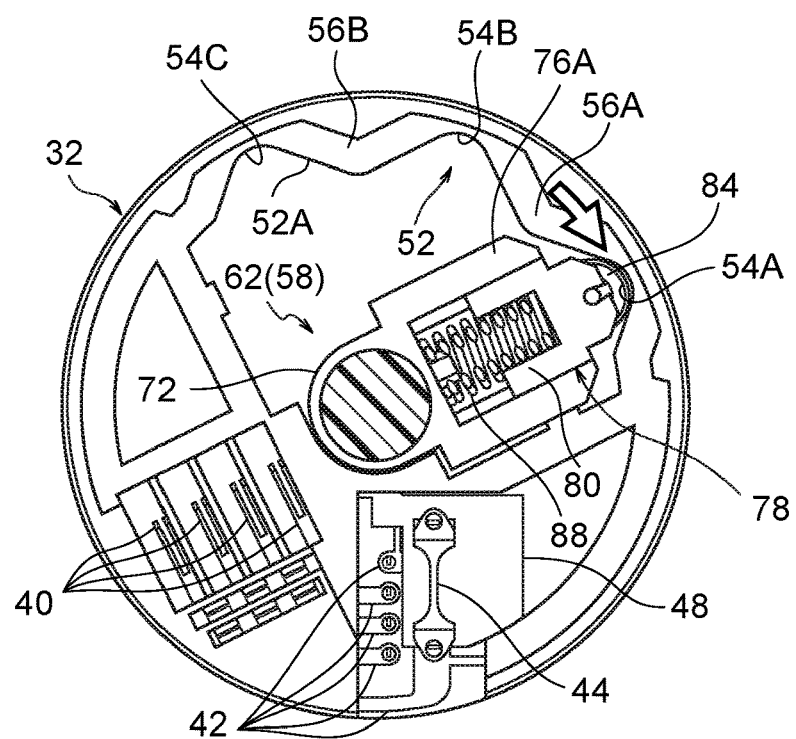
FIG. 13F is a partial cross-section corresponding to FIG. 13A and illustrating a state in which a dial has been moved to a slide operation position.

Namely, when an operator has removed their hand from the dial 58 at, for example, the position illustrated in FIG. 13C, the slider 78 fits into the nearby valley 54B by elastic recovery force from the roller spring 88 (see FIG. 13D). The dial 58 thereby automatically moves to the recliner operation position. In addition, when an operator has removed their hand from the dial 58 at, for example, the position illustrated in FIG. 13E, the slider 78 fits into the nearby valley 54A by elastic recovery force from the roller spring 88 (see FIG. 13F). The dial 58 thus automatically moves to the slide operation position.

Note that although omitted from illustration in the drawings, when the dial 58 is rotationally operated between the recliner operation position and the lifter operation position, the slider 78 crosses over the peak 56B while compressively deforming the roller spring 88 and sliding in the radial direction with respect to the dial 58. In cases in which an operator has removed their hand from the dial 58 partway through such rotational operation, the slider 78 fits into the nearby valley 54B or valley 54C by elastic recovery force from the roller spring 88. The dial 58 is thus configured to automatically move to either the lifter operation position or the recliner operation position, which are each one of the plural rotation positions.

As illustrated in FIG. 7, a knob support shaft 114 that projects toward the seat width direction outside is coaxially formed at a central portion of the switch base 62. A leading end portion of the knob support shaft 114 is fitted inside a cylindrical shaped support portion 118 (see FIG. 8) formed in a central portion of a bottom wall portion 60A of the dial body 60. The micro switch 94 is attached to one radial direction side of the seat width direction outside face of the switch base 62. The micro switch 94 corresponds to a "switch" of the present invention As illustrated in FIG. 7, FIG. 8, FIG. 14, and FIG. 15, the micro switch 94 is configured by a switch cover 96, a switch knob 98, a switch push-lock pin 102, a switch spring 104, a pair of switch contact terminals 106, and contacts 108. The micro switch 94 is housed in the dial 58. The switch cover 96 is formed in a box shape that is open at the switch base 62 side, and the switch cover 96 is attached to the switch base 62 by hook fittings. The switch knob 98 is housed inside the switch base 62.

The switch knob 98 is formed in a substantially box shape that is open at the switch base 62 side, and the switch knob 98 is supported with respect to the switch base 62 so as to slidable in the radial direction of the switch base 62. A circular column shaped projection 98A that projects toward the seat width direction outside is provided to the switch knob 98. The projection 98A passes through a rectangular through hole 100 formed in a bottom wall portion of the switch cover 96 and projects toward the seat width direction outside of the switch cover 96. The switch push-lock pin 102 and the switch spring 104 are disposed between the switch knob 98 and the switch base 62.

The switch push-lock pin 102 is formed in a block shape, and is biased toward the switch base 62 side by the switch spring 104, which is a compression coil spring. The pair of switch contact terminals 106 are disposed between the switch push-lock pin 102 and the switch base 62. The pair of switch contact terminals 106 make contact with the contacts 108 attached to the switch base 62, and the pair of switch contact terminals 106 are pressed against the contacts 108 by biasing force from the switch spring 104. The state of contact between the pair of switch contact terminals 106 and the contacts 108 is switched as a result of the switch knob 98 being slid in the switch base 62 radial direction with respect to the switch cover 96. The contacts 108 are electrically connected to the terminals 74 described above (see FIG. 7), and are configured such that the motor of the multi-shaft drive device 26 is actuated by the above switching.

The micro switch 94 configured as described above is reliable and versatile, can ensure tolerance to temperature changes, and also contributes to a reduction of production costs due to its simple structure. The micro switch 94 is configured so as to be operated by the knob 110.

Figure 14:
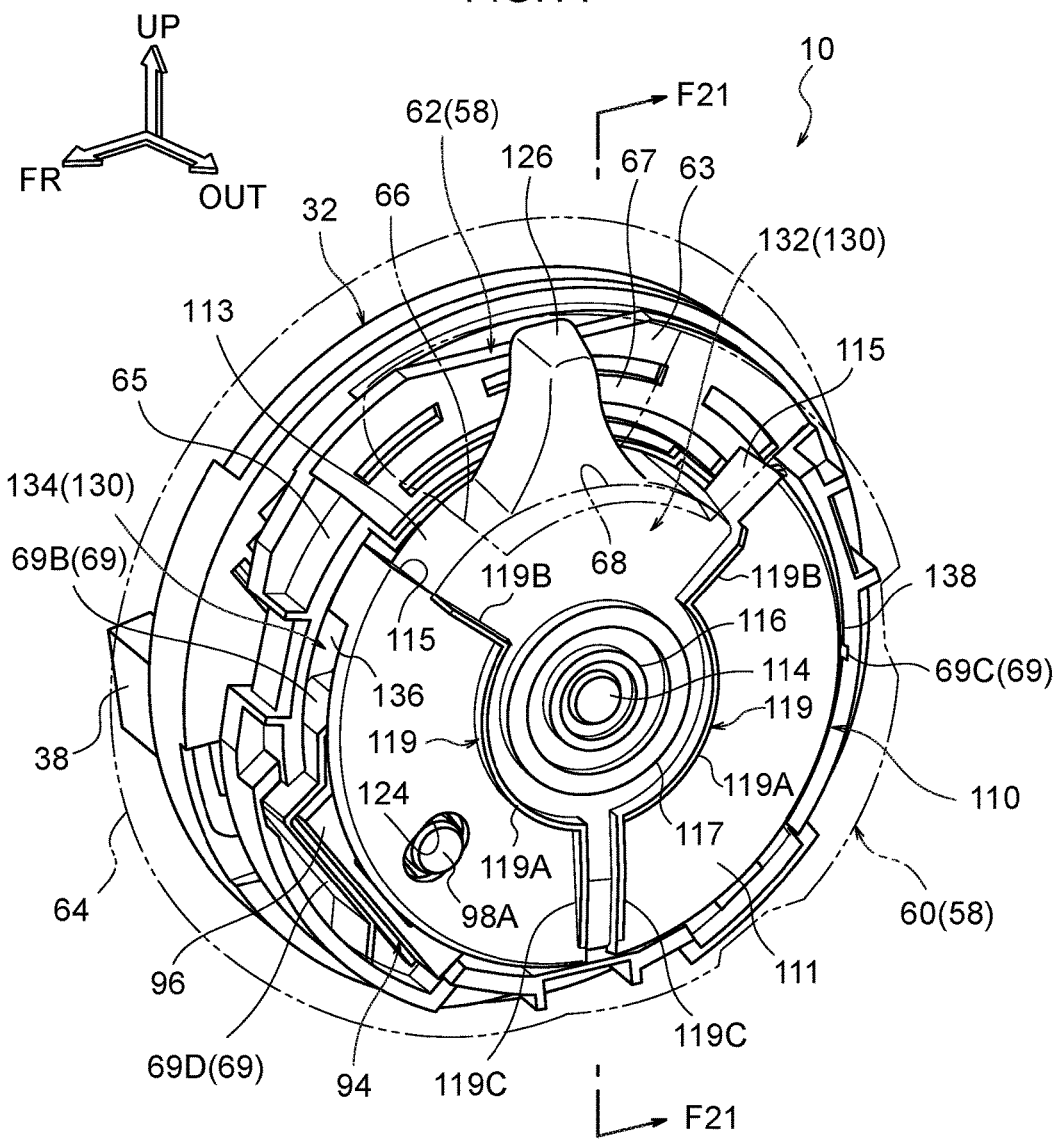
FIG. 14 is a perspective view illustrating a state in which a dial body and a cover have been removed from a power seat operation device.

As illustrated in FIG. 7, FIG. 8, and FIG. 14, the knob 110 is a single integrated unit including a knob body 111 formed in a substantially circular disc shape and a peripheral wall portion 113 extending from the outer periphery of the knob body 111 toward the seat width direction inside, with the knob body 111 and the peripheral wall portion 113. The knob 110 is formed in substantially the shape of a shallow bottomed dish. The knob body 111 and the peripheral wall portion 113 project toward the radial direction outside of the knob 110 at part of an outer peripheral portion of the knob 110. The operation portion 126 is thereby formed at the outer peripheral portion of the knob 110. The knob body 111 and the peripheral wall portion 113 are recessed toward the radial direction inside of the knob 110 at both sides of the operation portion 126. A pair of stopper portions (steps) 115 are formed to the outer peripheral portion of the knob 110. The stopper portions 115 face each other along the circumferential direction (rotation direction) across the operation portion 126. Note that the seat width direction dimension of the peripheral wall portion 113 diminishes at the side where the operation portion 126 and the pair of stopper portions 115 are not formed.

Except for at the operation portion 126, locations of the knob 110 to the seat width direction outside of the micro switch 94 are housed inside the dial 58. In contrast, the operation portion 126 is inserted through the opening 68 of the dial body 60 so as to project outside the dial body 60, and is disposed in the recess 66 of the dial body 60.

As illustrated in FIG. 8, a cylindrical shaped boss portion 112 that projects toward the switch base 62 side is formed at a central portion of the knob body 111. The circular column shaped knob support shaft 114 (see FIG. 7 and FIG. 15) that projects from the central portion of the switch base 62 rotatably fits inside the boss portion 112. As illustrated in FIG. 7, a ring shaped rotation support portion 116 that projects toward the bottom wall portion 60A side of the dial body 60 is formed at the central portion of the knob body 111 in a shape concentric to the knob body 111. The support portion 118 described above (see FIG. 8) formed at the central portion of the bottom wall portion 60A of the dial body 60 rotatably fits inside the rotation support portion 116. The switch knob 98 is thereby coaxially and rotatably supported with respect to the dial 58. Note that a ring shaped annular rib 117 that projects toward the bottom wall portion 60A side of the dial body 60 is formed to the central portion of the knob body 111 at the outside of the peripheral outside of the rotation support portion 116 in a shape concentric to the knob body 111.

A knob spring 120 (see FIG. 7) spans between the knob body 111 and the switch base 62. The knob spring 120 is a torsion coil spring, and is disposed coaxially to the knob body 111 and the switch base 62. The knob spring 120 biases the knob 110 toward the neutral position illustrated in FIG. 14 and FIG. 16A with respect to the switch base 62. Thus, the knob 110 is retained at the above-described neutral position with respect to the switch base 62 under normal circumstances when operational force is not being input to the knob 110.

As illustrated in FIG. 8, a pair of substantially angular column shaped slider engagement portions 122A, 122B are formed projecting toward the seat width direction inside (the switch base 62 side) at the peripheral outside of the seat width direction inside face of the knob body 111. The pair of slider engagement portions 122A, 122B are separated by a gap and face each other along the rotation direction (circumferential direction) of the knob 110. The pair of slider engagement portions 122A, 122B are curved along the rotation direction of the knob 110, as viewed along the axial direction of the knob 110.

Figure 16A:
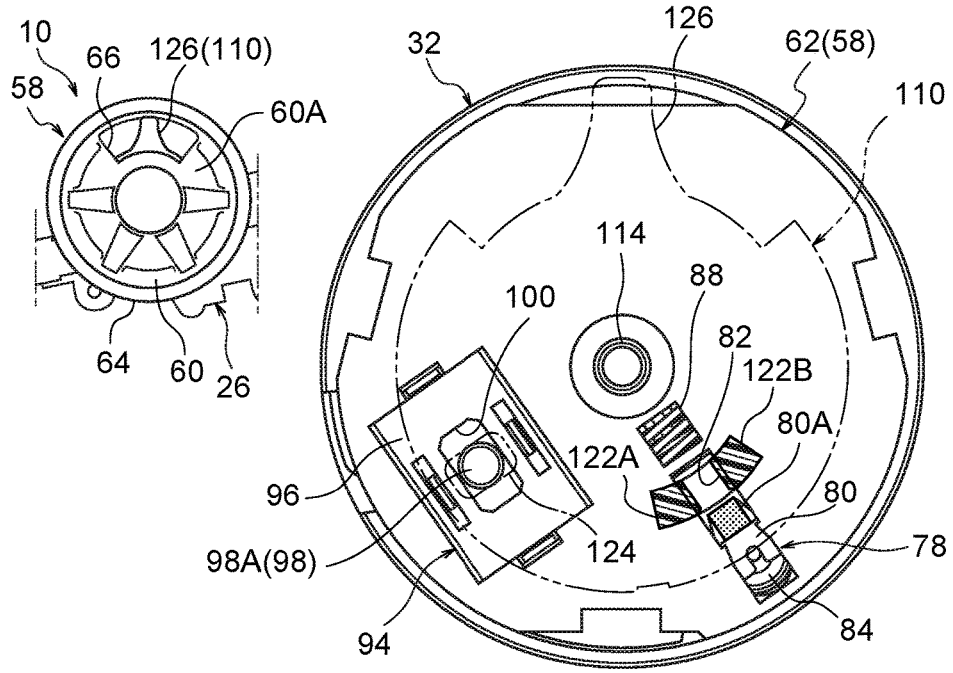
FIG. 16A is a partial cross-section for explaining the relationship between a pair of slider engagement portions of a knob and a knob engagement portion of a slider, and is a diagram illustrating a state of non-operation of the dial and the knob.

As illustrated in FIG. 16A, the pair of slider engagement portions 122A, 122B are disposed in the vicinity of the knob engagement portion 80A of the slider 78 described above and at the knob 110 center side of the knob engagement portion 80A. Configuration is such that, in a state in which the knob 110 is positioned at the neutral position, the gap (space) between the pair of slider engagement portions 122A, 122B faces toward the knob engagement portion 80A from the knob 110 radial direction center side thereof. Note that in FIG. 16A to FIG. 16D, the knob engagement portion 80A is applied with dots to facilitate recognition of the knob engagement portion 80A.

An oval shaped through hole 124 having its lengthwise direction aligned with the radial direction of the knob 110, as viewed along the axial direction of the knob 110, is formed to the peripheral outside of the knob body 111. The projection 98A of the switch knob 98 is inserted inside the through hole 124.

Figure 16B:
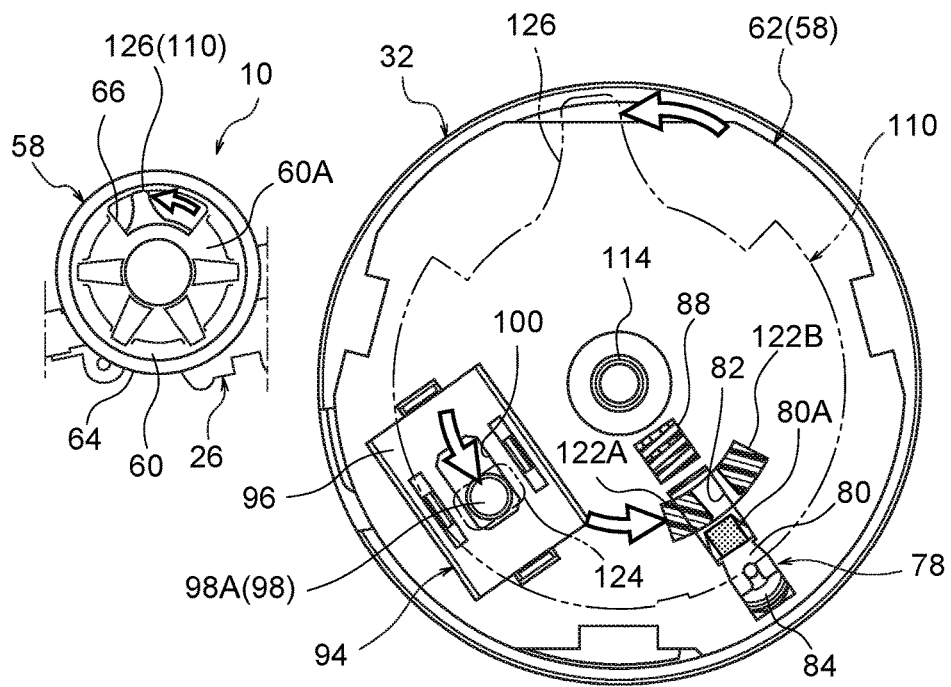
FIG. 16B is a partial cross-section illustrating a state in which a knob has been rotationally operated toward one side.

The knob 110 described above is relatively rotated with respect to the dial 58 by an occupant grasping the dial 58 and operating the operation portion 126 with a finger or the like. The micro switch 94 is thereby configured to be switch-operated. Specifically, as illustrated in FIG. 16B, when the operation portion 126 is operated from the neutral position toward one circumferential direction side of the dial 58, the knob 110 rotates toward one circumferential direction side with respect to the dial 58, and the switch knob 98 slides toward the one circumferential direction side with respect to the dial 58. The motor of the multi-shaft drive device 26 is thereby set to rotate forward. In this state, the one slider engagement portion 122A is configured so as to approach and face toward the knob engagement portion 80A from the knob 110 radial direction center side thereof.

Figure 16C:
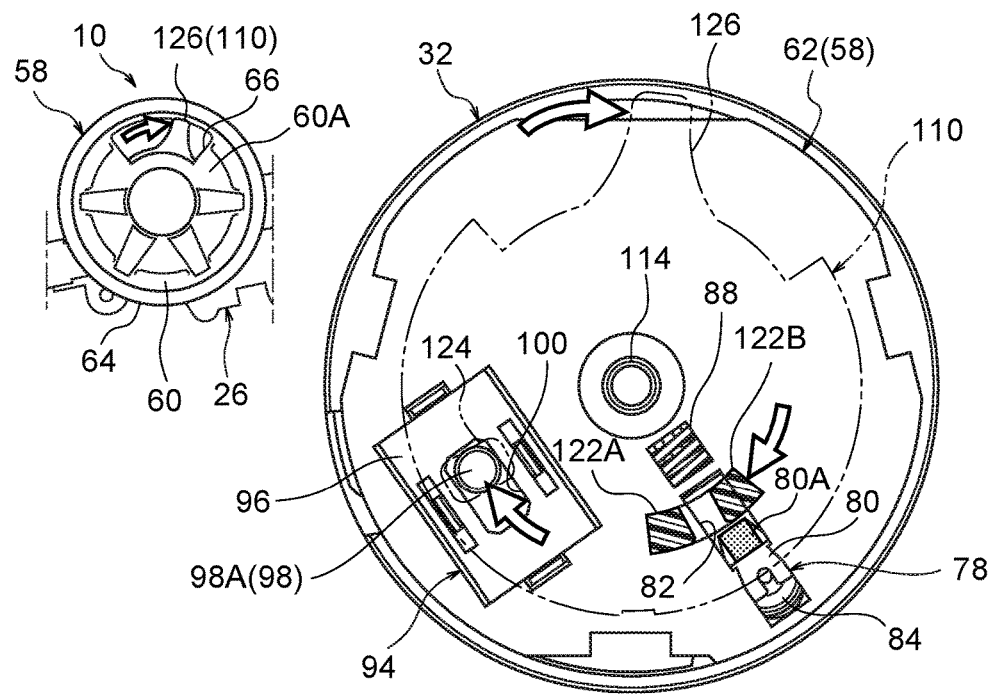
FIG. 16C is a partial cross-section illustrating a state in which a knob has been rotationally operated toward another side.

As illustrated in FIG. 16C, when the operation portion 126 is operated from the neutral position toward the other circumferential direction side of the dial 58, the knob 110 rotates toward the other circumferential direction side with respect to the dial 58 and slides the switch knob 98 toward the other circumferential direction side with respect to the dial 58. The motor of the multi-shaft drive device 26 is thereby set to rotate in reverse. In this state, the other slider engagement portion 122B is configured so as to approach and face toward the knob engagement portion 80A from the knob 110 radial direction center side thereof.

Figure 16D:
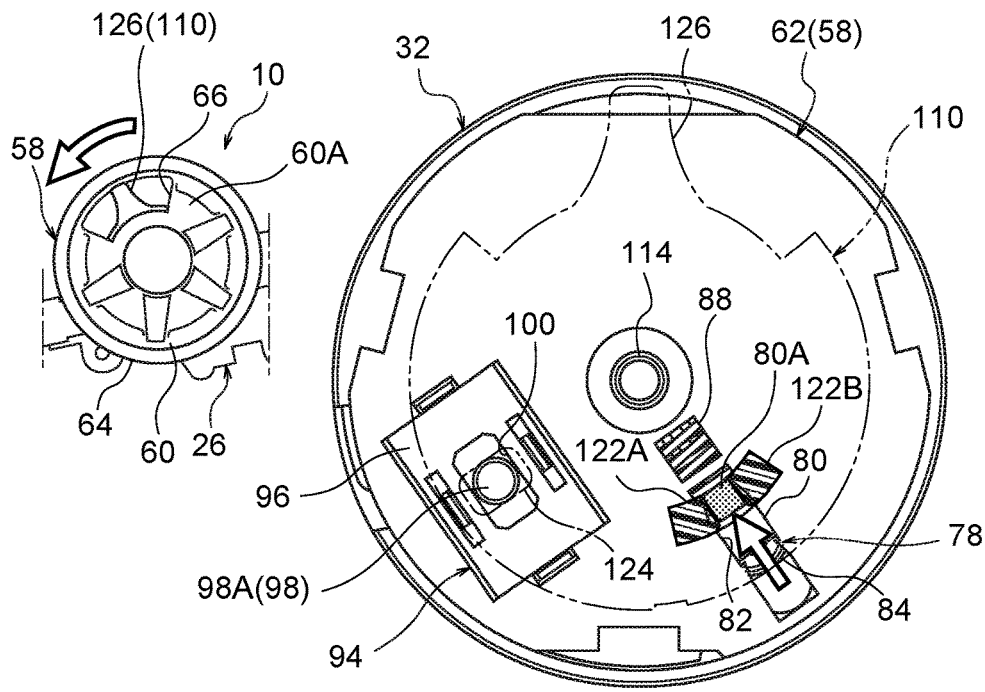
FIG. 16D is a partial cross-section illustrating a state in which a dial is partway through being rotationally operated.
Figure 17:
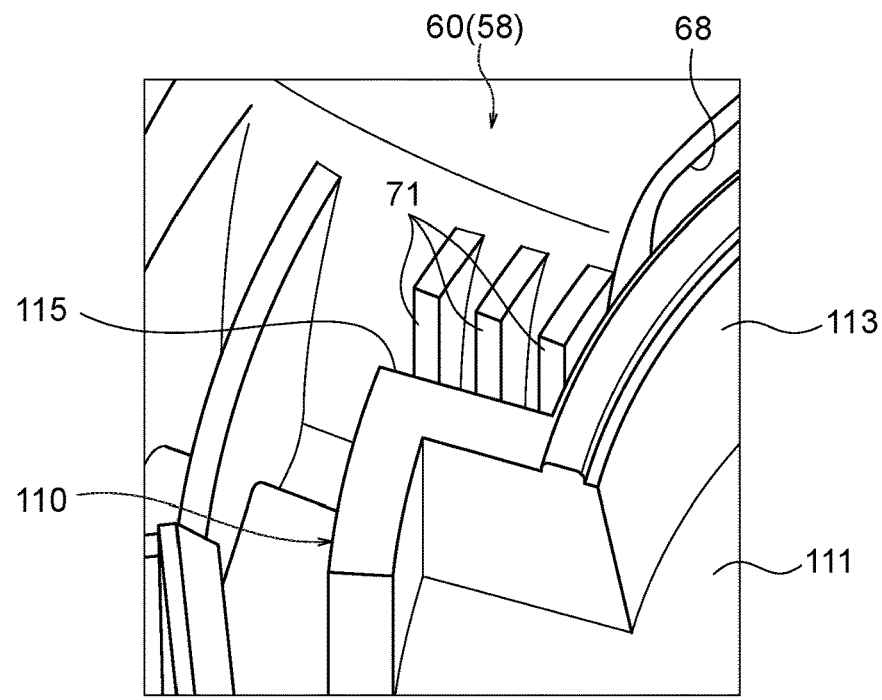
FIG. 17 is a perspective view illustrating a stopper portion provided to a knob and abutting portions provided to a dial.

As illustrated in FIG. 16D, when the slider 78 is slid toward the radial direction center with respect to the dial 58 by rotational operation of the dial 58, configuration is such that the knob engagement portion 80A is disposed (inserted) between the pair of slider engagement portions 122A, 122B. Note that when the knob 110 is rotated a predetermined amount from the neutral position toward one circumferential direction side of the dial 58, one of the stopper portions 115 abuts abutting portions 71 (see FIG. 17) formed in the shape of three ribs at one side of the recess 66 in the dial body 60. Further rotation of the knob 110 is thereby restricted. Similarly, when the knob 110 is rotated by a predetermined amount from the neutral position toward the other circumferential direction side of the dial 58, the other of the stopper portions 115 abuts a non-illustrated abutting portion formed at the other side of the recess 66 in the dial body 60. Configuration is thereby such that further rotation of the knob 110 is restricted. Namely, the pair of stopper portions 115 include functionality to restrict the rotation range of the knob 110 with respect to the dial 58. Next, explanation follows regarding relevant portions of the present exemplary embodiment.

Relevant Portions of the Present Exemplary Embodiment

Figure 15:
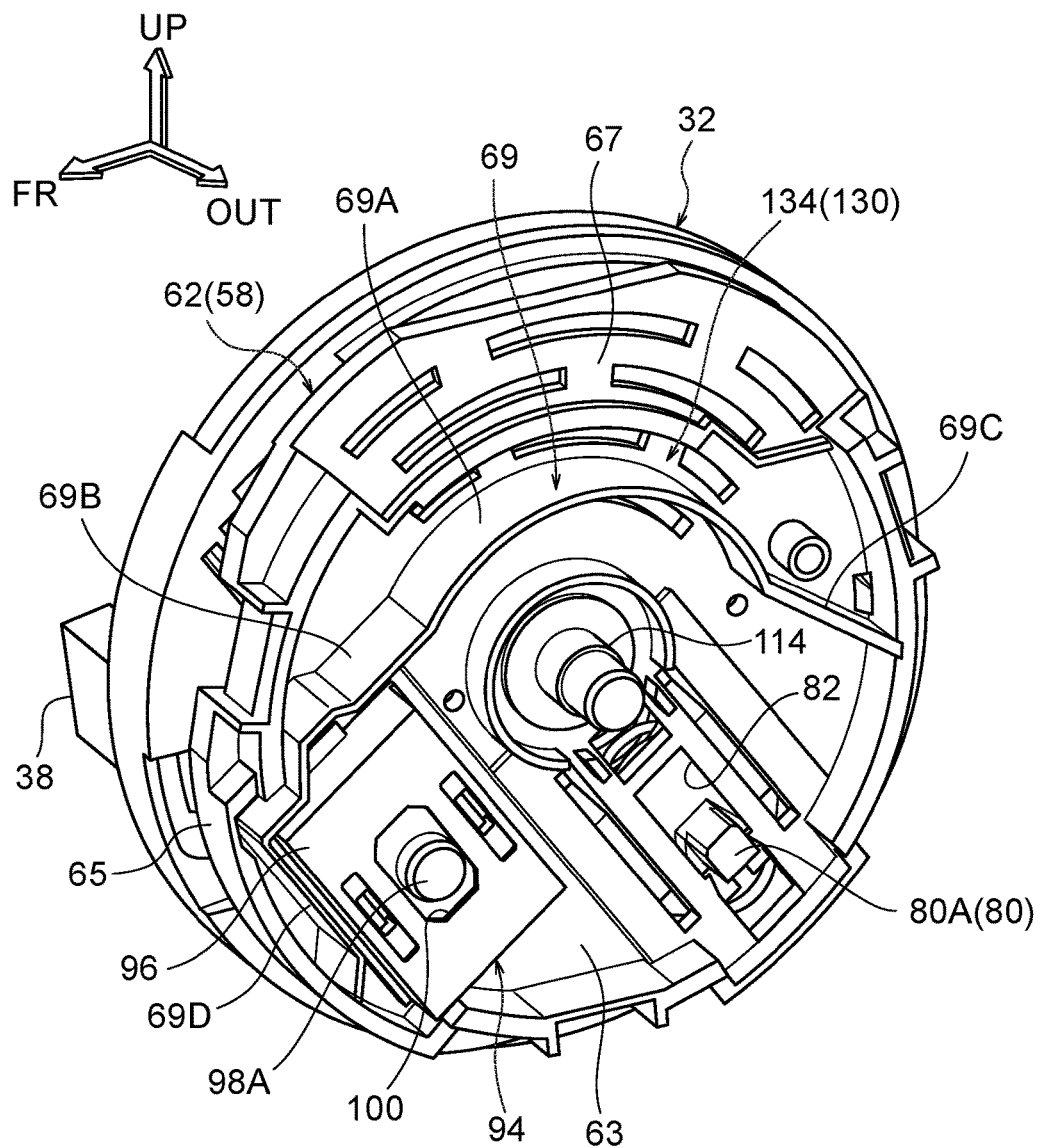
FIG. 15 is a perspective view illustrating a state in which a knob has further been removed from the configuration illustrated in FIG. 14.
Figure 18:
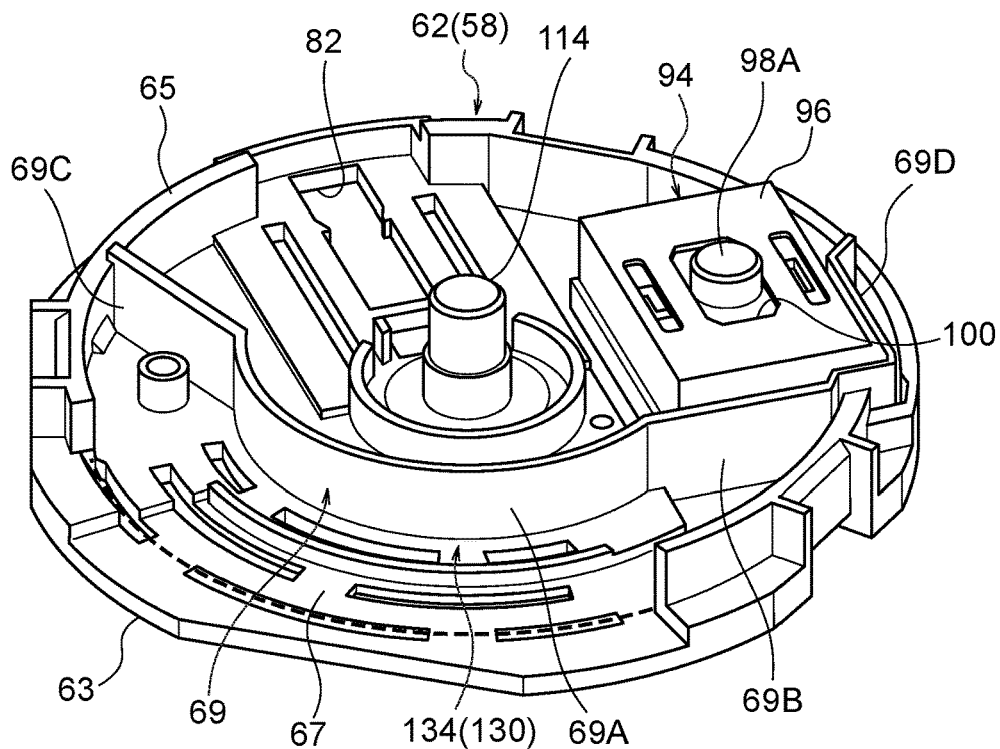
FIG. 18 is a perspective view illustrating a switch base and a micro switch, which are configuration members of a dial.

As illustrated in FIG. 14, FIG. 15, and FIG. 18, in the present exemplary embodiment, a channel 130 is formed in the dial 58 by the dial 58 and the knob 110 described above. The channel 130 is a liquid discharge path for discharging to outside the dial 58 any liquid that had infiltrated into the dial 58. The channel 130 is configured including an outer channel 132 formed using a pair of knob reinforcement ribs 119 formed to the knob 110, and an inner channel 134 formed using a dial reinforcement rib 69 formed to the switch base 62 of the dial 58. In the channel 130 there is partitioning from the micro switch 94 by portions of the dial 58 and the knob 110 (the region in which the micro switch 94 is disposed is partitioned off). Detailed explanation follows.

As illustrated in FIG. 14, the pair of knob reinforcement ribs 119 integrally project from the seat width direction outside face of the knob body 111 toward the seat width direction outside, and extend from the operation portion 126 side of the knob 110 toward the side opposite to the operation portion 126. The pair of knob reinforcement ribs 119 are positioned on mutually opposite sides of the annular rib 117 to each other, and are symmetrically formed about the annular rib 117. The pair of knob reinforcement ribs 119 increase the flexural strength of the knob body 111.

An intermediate portion positioned at the knob 110 radial direction central side of each of the pair of knob reinforcement ribs 119 is configured as a circular arcuate portion 119A that curves in a circular arc shape centered on the knob 110. Outward extending portions 119B, 119C extend from both end portions of each of the arcuate portions 119A toward the peripheral outside of the knob 110. In the pair of knob reinforcement ribs 119, end portions of the outward extending portions 119B positioned on the operation portion 126 side of the arcuate portions 119A are formed contiguous to the stopper portions 115 so as to be in the same plane thereas. Further, in the pair of knob reinforcement ribs 119, end portions of each of the outward extending portions 119C positioned on the opposite side of the circular arcuate portion 119A to the operation portion 126 side are positioned at the outer peripheral portion of the knob 110.

The seat width direction outside end portions of the pair of knob reinforcement ribs 119 abut, or face in close proximity, the bottom wall portion 60A of the dial body 60 (wall portions on the seat width direction outside of the dial 58). The outer channel 132, bounded by the pair of knob reinforcement ribs 119, is thus formed between the bottom wall portion 60A of the dial body 60 and the knob body 111 of the knob 110. The outer channel 132 is partitioned from the micro switch 94 by the knob body 111 (part of the knob 110).

As illustrated in FIG. 15 and FIG. 18, the dial reinforcement rib 69 is provided inside the dial 58 between the opening 68 of the dial body 60 and the micro switch 94. The dial reinforcement rib 69 integrally projects toward the seat width direction outside from the seat width direction outside face of the base body 63 of the switch base 62 (seat width direction inside wall portion of the dial 58). The dial reinforcement rib 69 increases the flexural strength of the switch base 62.

The dial reinforcement rib 69 extends along radial directions of the switch base 62 from one outer peripheral portion of the switch base 62 to another outer peripheral portion of the switch base 62, and forms a convex shape on the opening 68 side at a switch base 62 radial direction central side of the dial reinforcement rib 69. Specifically, an intermediate portion of the dial reinforcement rib 69 positioned at the switch base 62 central side thereof is configured as a circular arcuate portion 69A that is curved in a shape concentric to the switch base 62. The circular arcuate portion 69A is positioned at the opening 68 side of the knob support shaft 114, and forms a circular arc shape convex on the opening 68 side.

Outward extending portions 69B, 69C extend from the two respective end portions of the circular arcuate portion 69A toward the peripheral outside of the switch base 62. One outward extending portion 69B extends toward one radial direction side of the switch base 62 (the side where the micro switch 94 is disposed), and is sloped away from the opening 68 as it approaches an outer peripheral portion of the switch base 62. A downwardly extending portion 69D extends away from the opening 68 at an end portion of the one outward extending portion 69B on the opposite side to the circular arcuate portion 69A. An end portion of the downwardly extending portion 69D on the opposite side to the outward extending portion 69B is integrally connected to the peripheral wall portion 65 of the switch base 62.

The other outward extending portion 69C extends toward another radial direction side of the switch base 62 (on the side opposite to where the micro switch 94 is disposed), and slopes so as to slope away from the opening 68 as it approaches an outer peripheral portion of the switch base 62. An end portion of the other outward extending portion 69C on the opposite side to the circular arcuate portion 69A is integrally connected to the peripheral wall portion 65 of the switch base 62.

Seat width direction outside end portions of the dial reinforcement rib 69 configured as described above face the knob body 111 in close proximity thereto. The inner channel 134, bounded by the dial reinforcement rib 69, is thereby formed between the base body 63 of the switch base 62 and the knob body 111 of the knob 110. The inner channel 134 is partitioned from the micro switch 94 by the dial reinforcement rib 69 (part of the dial 58). Note that the slight gap between the seat width direction outside end portion of the dial reinforcement rib 69 and the knob body 111 is configured so as to be closed off by grease or a rubber lip member (see the region applied with dots in FIG. 20).

Figure 19:
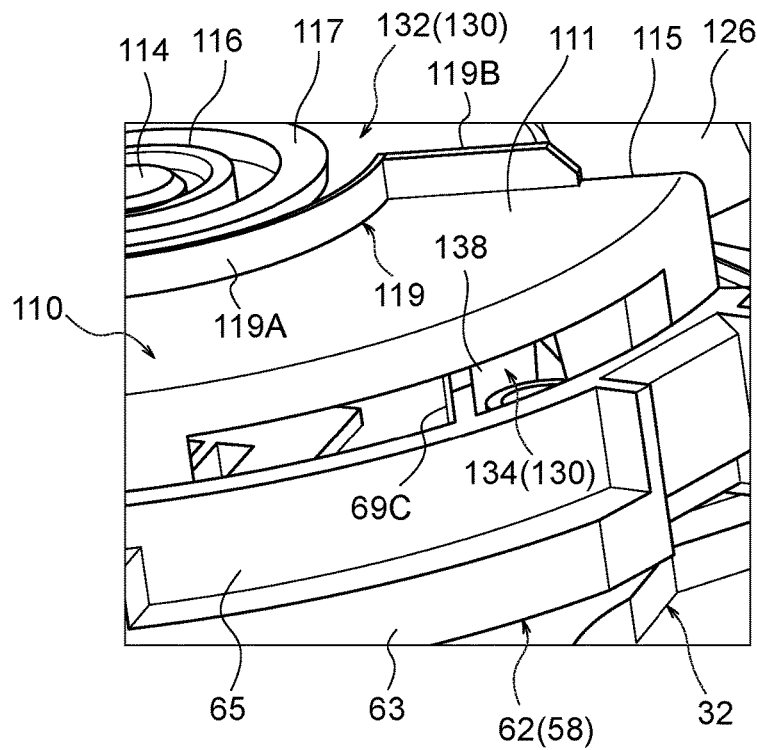
FIG. 19 is a perspective view illustrating peripheral configuration including one end portion of an inner channel.
Figure 20:
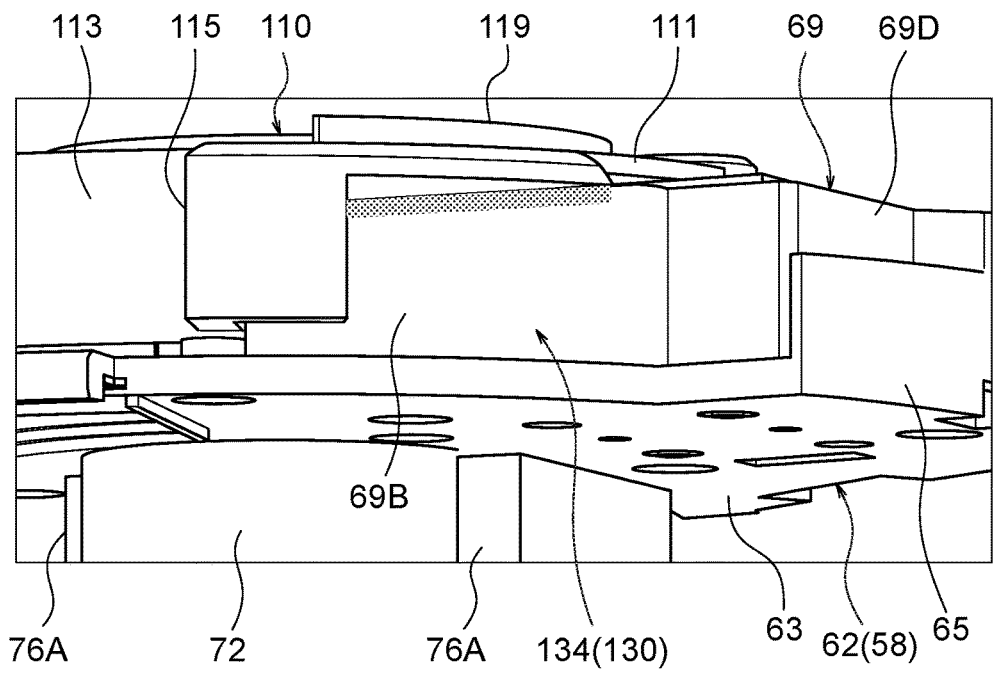
FIG. 20 is a perspective view for explaining plugging of a gap between a dial reinforcement rib provided to a switch base and a knob.
Figure 21:
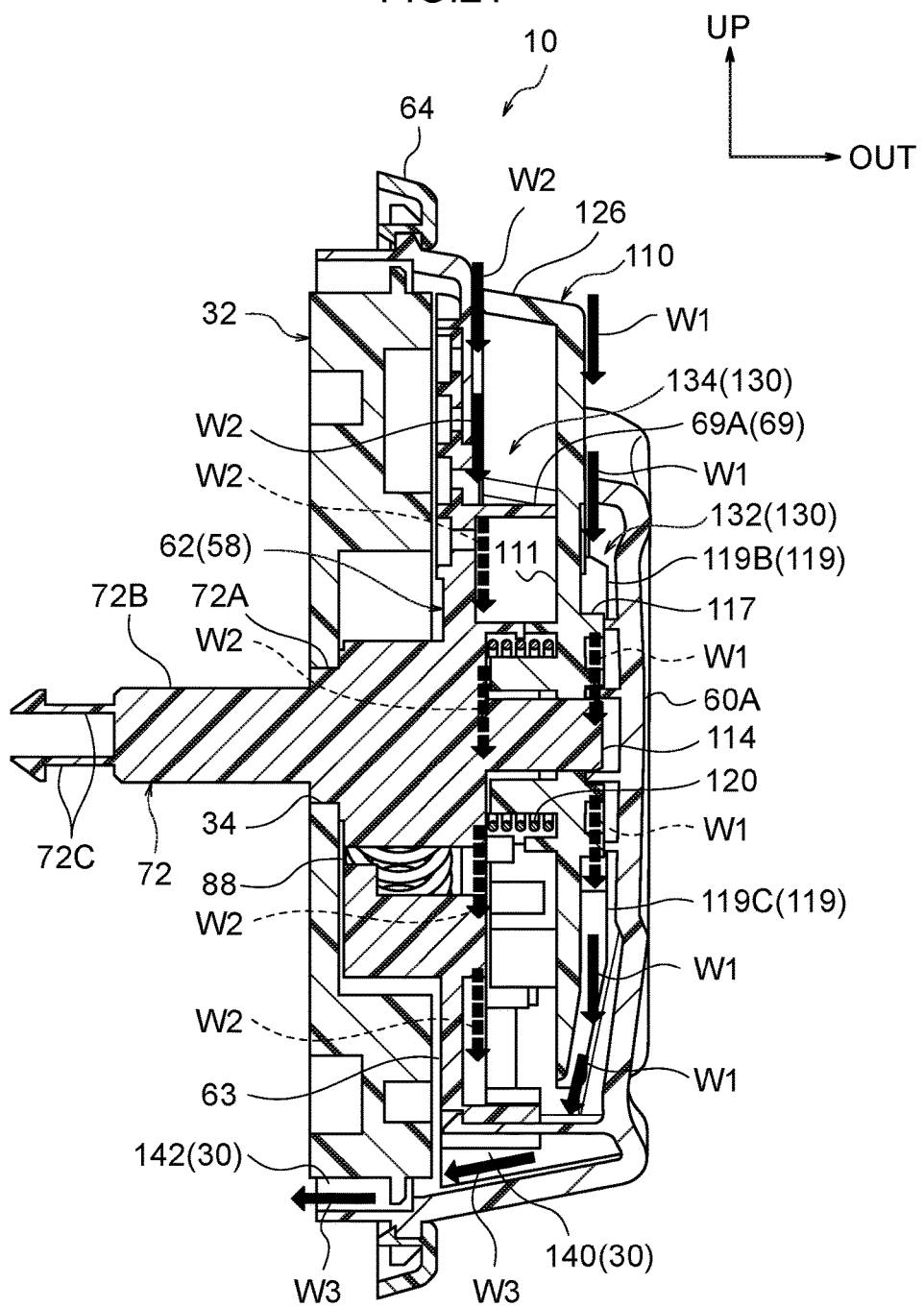
FIG. 21 is a cross-section illustrating a section taken along line F21-F21 in FIG. 14, and is a diagram for explaining the flow of liquid through an outer channel and an inner channel.
Figure 22:
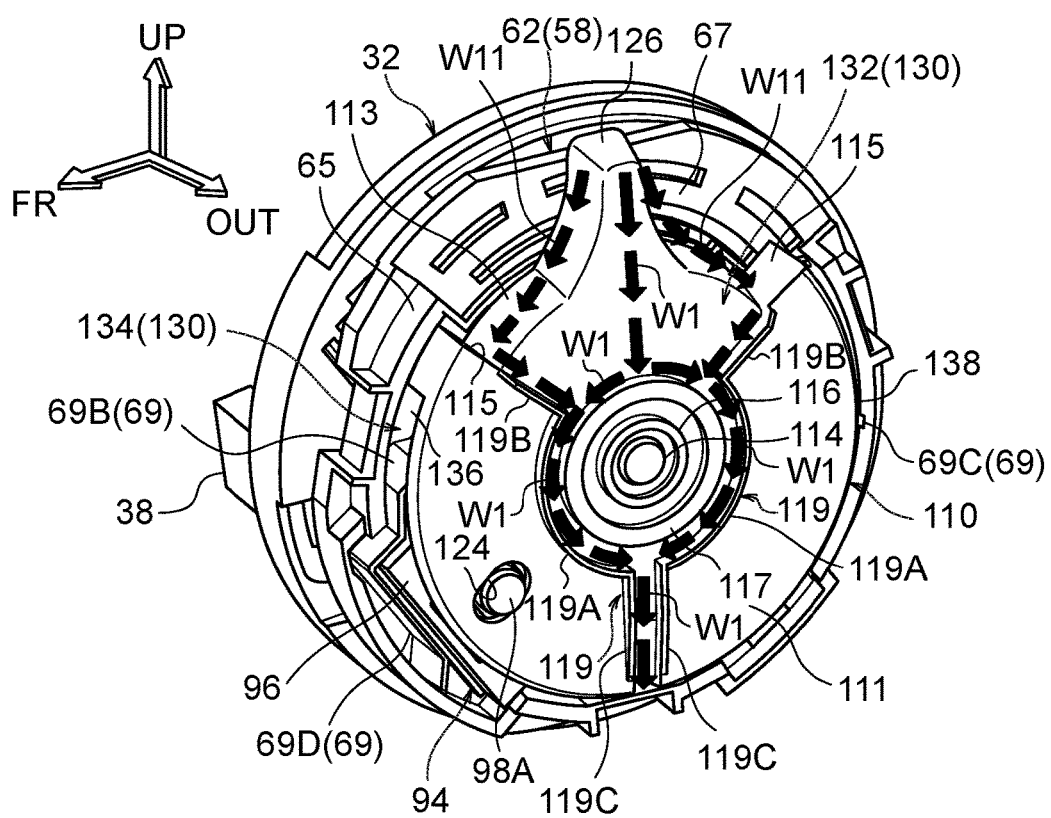
FIG. 22 is a perspective view corresponding to FIG. 14 for explaining the flow of liquid through the outer channel.
Figure 23:
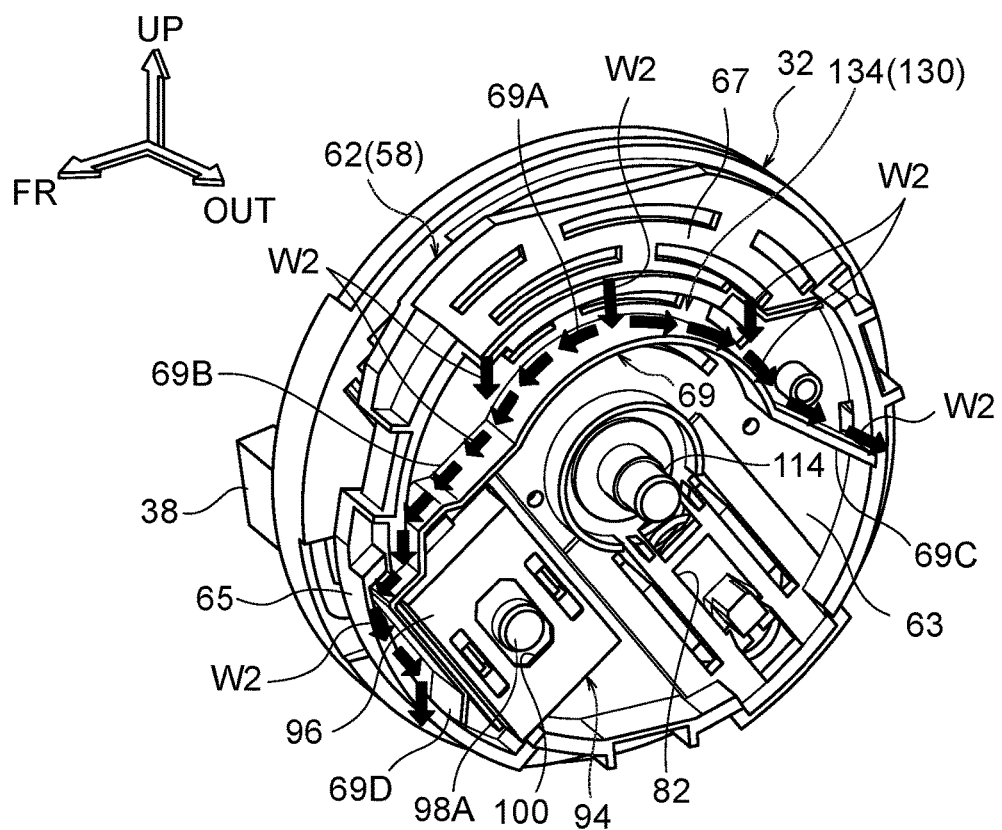
FIG. 23 is a perspective view corresponding to FIG. 14 for explaining the flow of liquid through the inner channel.

Further, as illustrated in FIG. 18 and FIG. 19, the projection height of the dial reinforcement rib 69 is set so as to be higher from the base body 63 than the peripheral wall portion 65. Thereby, as illustrated in FIG. 14 and FIG. 19, the respective two end portions of the inner channel 134 are open to the outside of the peripheral outside of the switch base 62 at the openings 136, 138 formed between the outer portion of the knob body 111 and the peripheral wall portion 65.

Figure 2:
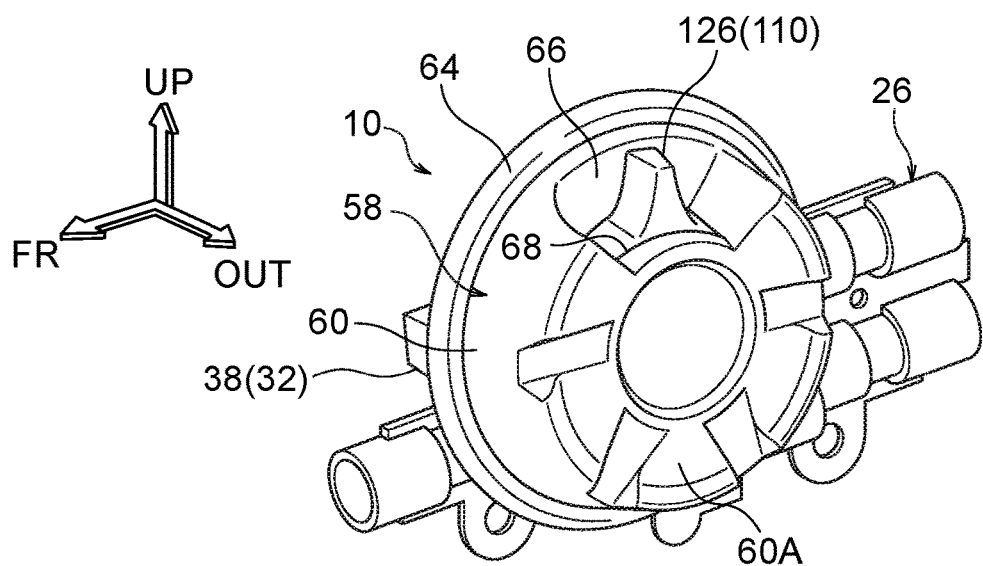
FIG. 2 is a perspective view of a power seat operation device and a multi-shaft drive device included in the same power seat, and illustrates a state in which a dial included in the power seat operation device is positioned at a slide operation position.
Figure 3:
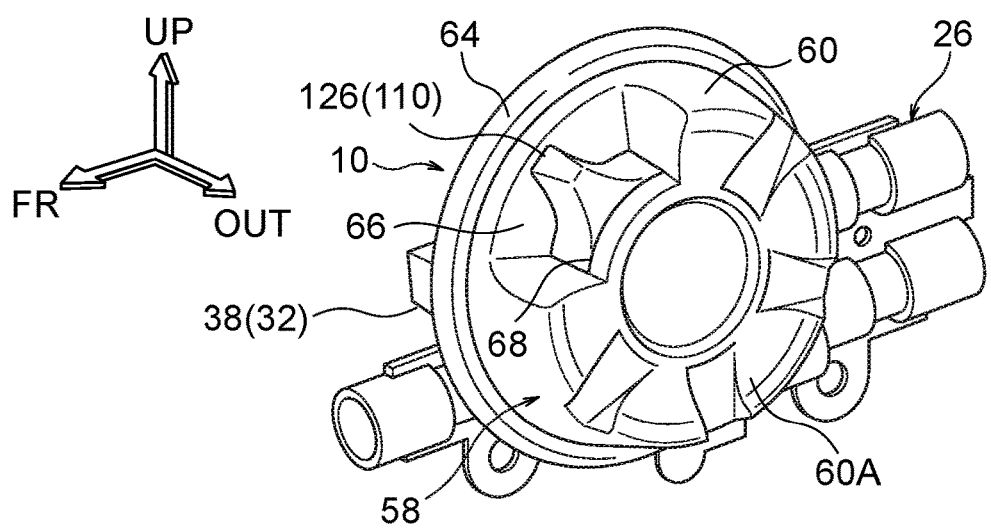
FIG. 3 is a perspective view corresponding to FIG. 2 and illustrating a state in which the dial is positioned at a recliner operation position.
Figure 4:
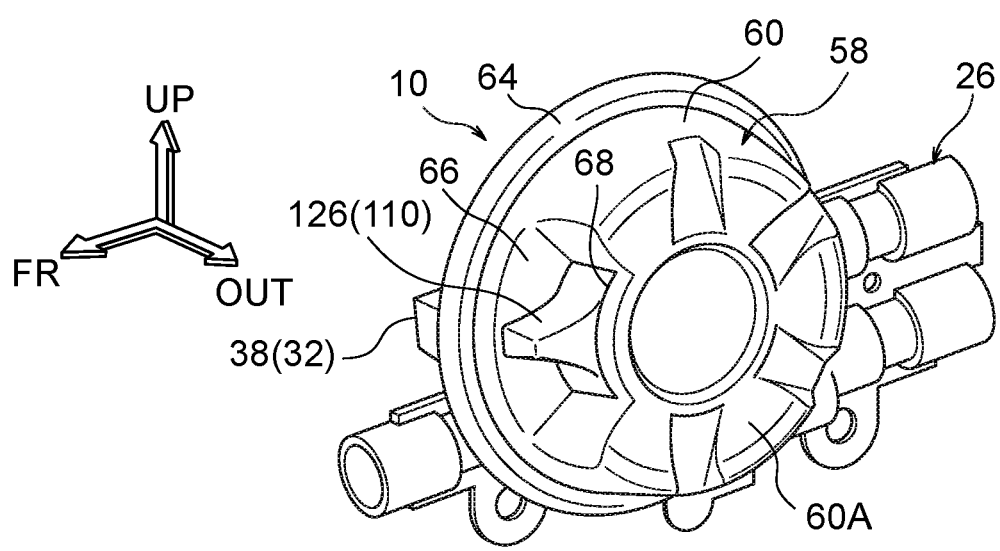
FIG. 4 is a perspective view corresponding to FIG. 2 and illustrating a state in which the dial is positioned at a lifter operation position.
Figure 5:
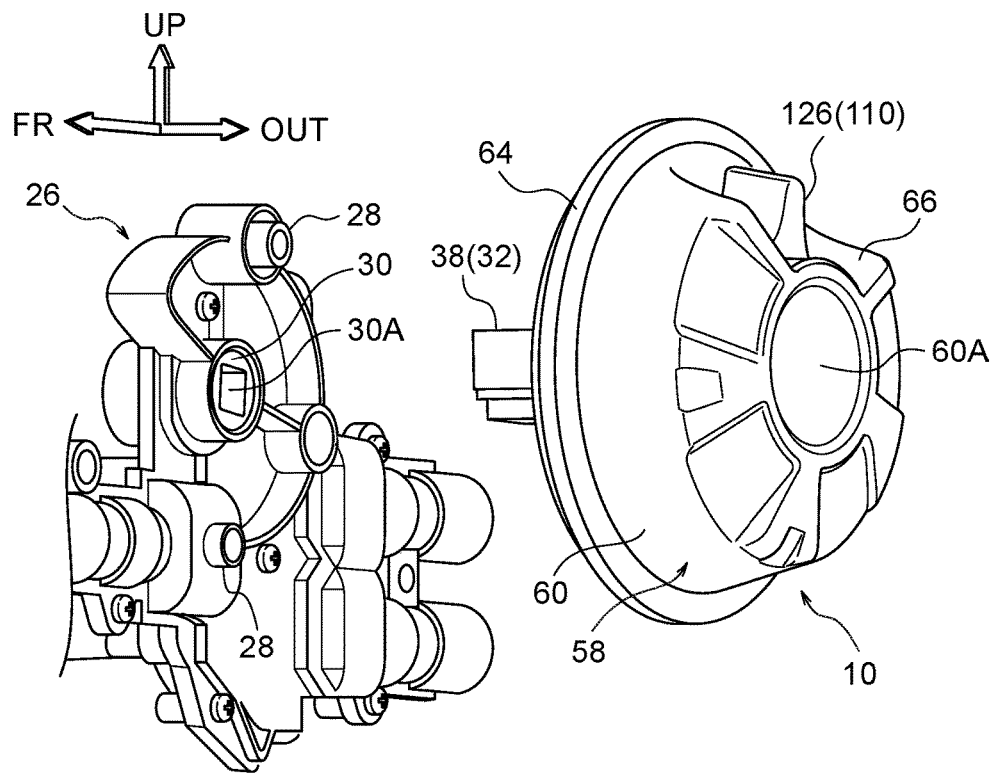
FIG. 5 is a perspective view illustrating a state in which a power seat operation device has been removed from a multi-shaft drive device.

In the power seat operation device 10 configured as described above, in a state in which the opening 68 of the dial 58 is positioned at the upper side of the micro switch 94, namely, in a state in which the dial 58 is positioned at the slide operation position illustrated in FIG. 2 or the recliner operation position illustrated in FIG. 3, configuration is such that liquid flows downward through the channel 130 described above to the lower side of the micro switch 94 in cases in which liquid has infiltrated into the dial 58 through the opening 68.

Specifically, in cases in which liquid has infiltrated into the dial 58 through the opening 68 and flowed between the bottom wall portion 60A of the dial body 60 and the knob 110 (see arrow W1 in FIG. 21 and FIG. 22), the liquid flows downward through the outer channel 132 to the lower side of the micro switch 94. Moreover, configuration is such that in such cases, any liquid that infiltrates into the dial 58, by way of the peripheral wall portion 113 of the knob 110 (see arrow W11 in FIG. 22), strikes the pair of stopper portions 115 and is guided to the outer channel 132 by the pair of stopper portions 115.

Further, in cases in which liquid has infiltrated into the dial 58 through the opening 68 and flowed between the base body 63 and the knob 110 (see arrow W2 in FIG. 21 and FIG. 23), the liquid flows downward through the inner channel 134 to the lower side of the micro switch 94. Configuration is such that next, any liquid that has flowed downward through the outer channel 132 and the inner channel 134 to the lower side of the micro switch 94, is discharged to outside the dial 58 through a gap 140 between the dial body 60 and the switch base 62, and through a gap 142 between the dial body 60 and the dial base 32 (see arrow W3 in FIG. 21). The gaps 140, 142 are positioned at the opposite side of the center of the dial 58 to the opening 68 side, and configure part of the channel 130. Note that in the regions indicated by the arrows W1, W2 using broken lines in FIG. 21, configuration is such that liquid flows to the near side and the far side of the cross-section illustrated in FIG. 21.

Operation and Advantageous Effects

Explanation follows regarding operation and advantageous effects of the present exemplary embodiment.

In the power seat 12 configured as described above, the dial 58 of the power seat operation device 10 is rotatably installed to the side face 16A of the seat cushion 16. The micro switch 94 is attached inside the dial 58. The knob 110 is installed inside the dial 58 at the seat width direction outside of the micro switch 94. The knob 110 is rotatably supported by the dial 58, and the operation portion 126 provided to the knob 110 is inserted through the opening 68 formed at the peripheral outside of the dial 58 so as to project to outside the dial 58. One out of the plural moving mechanisms provided to the power seat 12 is selected by rotational operation of the dial 58. Operation of the operation portion of the knob 110 operates the micro switch 94 inside the dial 58, thereby actuating the selected moving mechanism.

However, since the dial 58 is formed with the opening 68 in order to insert the operation portion 126 of the knob 110 through, in cases in which a liquid, such as rainwater or a beverage, splashes on the dial 58, there is a possibility that the liquid might infiltrate into the dial 58 through the opening 68. As for this point, in the present exemplary embodiment, the channel 130 is formed inside the dial 58 by the dial 58 and the knob 110. The channel 130 lets liquid flow downward to the lower side of the micro switch 94 so as to be discharged to outside the dial 58, in cases in which liquid has infiltrated through the opening 68 into the dial 58 in a state in which the opening 68 of the dial 58 is positioned at the upper side of the micro switch 94. Since the channel 130 is partitioned from the micro switch 94 by parts of the dial 58 and the knob 110, liquid can be prevented or suppressed from flowing to the micro switch 94. As a result, the occurrence of malfunction, shorting, etc. can be prevented or suppressed.

Specifically, in the present exemplary embodiment, inside the dial 58, the knob 110 installed to the seat width direction outside of the micro switch 94 includes the pair of knob reinforcement ribs 119 that project toward the seat width direction outside. In the knob 110, the pair of knob reinforcement ribs 119 extend from the side of the operation portion 126 that is inserted through the opening 68 of the dial 58, toward the opposite side to the operation portion 126. The outer channel 132 configuring part of the channel 130 is formed between the bottom wall portion 60A of the dial body 60 and the knob 110 using the pair of the knob reinforcement ribs 119. Accordingly, in cases in which liquid that has infiltrated into the dial 58 through the opening 68 has flowed between the bottom wall portion 60A of the dial body 60 and the knob 110, the liquid flows through the outer channel 132 downward to the lower side of the micro switch 94 and is discharged to outside the dial 58.

The knob 110 described above also includes the pair of stopper portions 115 that face one another in their own rotation direction, across the operation portion 126. The pair of stopper portions 115 abut the dial 58 so as to restrict the rotation range of the knob 110 with respect to the dial 58. The pair of stopper portions 115 also guide any liquid that had infiltrated into the dial 58 through the opening 68 as described above to the outer channel 132. Namely, configuration to restrict the rotation range of the knob 110 with respect to the dial 58 also doubles as configuration to prevent or suppress liquid from flowing to the micro switch 94. This enables a rationalized configuration to be achieved.

Further, in the present exemplary embodiment, inside the dial 58, the dial reinforcement rib 69 projecting out from the base body 63 of the switch base 62 toward the seat width direction outside are interposed between the opening 68 of the dial 58 and the micro switch 94. The inner channel 134 configuring part of the channel 130 is formed between the base body 63 and the knob 110 using the dial reinforcement rib 69. Accordingly, in cases in which liquid has infiltrated into the dial 58 through the opening 68 as described above and flowed between the base body 63 and the knob 110, the liquid flows through the inner channel 134 downward to the lower side of the micro switch 94 and is discharged to outside the dial 58.

Further, the dial reinforcement rib 69 extends along radial directions of the switch base 62 from one portion to another portion at the outer periphery of the switch base 62, and forms a shape that is convex on the opening 68 side at the radial direction central side of the switch base 62. This enables liquid that has flowed between the base body 63 and the knob 110 to be caused by the dial reinforcement rib 69 to flow toward the one portion side and the other portion side of the outer periphery of the switch base 62. Namely, the liquid can be split between a flow path toward one outer peripheral portion side of the switch base 62 and a flow path toward another outer peripheral portion side of the switch base 62, thereby enabling a configuration to be achieved in which liquid does not become over-concentrated in any one path in cases in which, for example, a large amount of liquid has flowed into the inner channel 134.

Further, in the present exemplary embodiment, the outer channel 132 and the inner channel 134 are formed using the pair of knob reinforcement ribs 119 for reinforcing the knob body 111 and the dial reinforcement rib 69 for reinforcing the base body 63. This enables a more rationalized configuration to be achieved compared to cases in which dedicated ribs are set to form the outer channel 132 and the inner channel 134 (the channel 130).

Note that in the above exemplary embodiment, explanation was given regarding a case in which the seat slide mechanism 20, the recliner mechanism 22, and the lifter mechanism 24 configure the plural moving mechanisms, the present invention is not limited thereto. For example, a tilt mechanism that adjusts an inclination angle of the seat cushion with respect to a vehicle front-rear direction, a side-support adjustment mechanism that adjusts the height of a side-support section provided to the seat cushion or the seat back, an ottoman mechanism that swings an ottoman with respect to the seat cushion, about a swing axis running along the seat width direction, may be applied as moving mechanisms.

Further, in the above exemplary embodiment, although the cam portion 52 is configured to include the three valleys 54A, 54B, 54C and the two peaks 56A, 56B, the present invention is not limited thereto, and the number of peaks and valleys may be modified as appropriate. For example, configuration may be such that the cam portion 52 is provided with four valleys and three peaks.

Further, in the above exemplary embodiment, although configuration is such that the dial reinforcement rib 69 extending in radial directions of the switch base 62 from one outer peripheral portion of the switch base 62 (dial 58) to another outer peripheral portion of the switch base 62 forms a shape that is convex on the opening 68 side at the switch base 62 radial direction central side of the dial reinforcement rib 69, the present invention is not limited thereto, and the shape of the dial reinforcement rib may be modified as appropriate in accordance with the placement inside the dial 58 of the micro switch 94 (switch) and the like.

Further, in the above exemplary embodiment, although the pair of stopper portions 115 of the knob 110 and configured to guide liquid that has infiltrated into the dial 58 through the opening 68 to the outer channel 132, the present invention is not limited thereto. For example, configuration may be such that a rib or the like is set separately from the pair of stopper portions 115 to guide liquid that has infiltrated into the dial 58 through the opening 68 to the outer channel 132.

Further, in the above exemplary embodiment, although configuration is such that the dial reinforcement rib 69 is integrally formed to the base body 63 and the pair of knob reinforcement ribs 119 are integrally formed to the knob body 111, the present invention is not limited thereto. Namely, configuration may be such that a reinforcement rib that has been formed as a distinct body from the base body 63 and the knob body 111 is then fixed to the base body 63 and the knob body 111.

Further, in the above exemplary embodiment, although the switch base 62 (the dial 58) and the knob 110 are configured to include reinforcement ribs (the dial reinforcement rib 69 and the pair of knob reinforcement ribs 119) inside the dial 58 that project in the seat width direction and the channel 130 is formed using these reinforcement ribs, the present invention is not limited thereto. Namely, configuration may be such that a dedicated rib for forming a channel may be set to at least one out of the dial or knob. Further, there is no limitation to forming ribs on the dial or the knob, and a channel may be formed by setting a shape (a recessed portion or the like) on the dial or the knob.

Various other modifications may be implemented within a range not departing from the spirit of the present invention. Obviously, the scope of rights encompassed by the present invention is not limited to the exemplary embodiment described above.

The entire disclosure of Japanese Patent Application No. 2015-121193 filed on Jun. 16, 2015 is incorporated by reference in the present specification. All cited documents, patent applications, and technical standards mentioned in the present specification are incorporated by reference in the present specification to the same extent as if each individual cited document, patent application, or technical standard was specifically and individually indicated to be incorporated by reference.

What is claimed is:

1. A power seat operation device comprising:
a dial that is rotatably installed at a side face of a power seat provided with a plurality of moving mechanisms, one of the plurality of moving mechanisms being selected by rotational operation of the dial, and an interior and an exterior of the dial being in communication through an opening formed at a peripheral outer side of the dial;
a switch that is attached inside the dial, the switch actuating the selected moving mechanism;
a knob that is installed inside the dial at a seat width direction outer side of the switch, that is rotatably supported by the dial, that includes an operation portion inserted through the opening so as to project outside the dial, and that is capable of operating the switch by operation of the operation portion; and
a channel that is formed inside the dial by the dial and the knob, the channel being partitioned from the switch, and, in cases in which liquid has infiltrated into the dial through the opening in a state in which the opening is positioned at an upper side of the switch, the channel letting the liquid flow downward to a lower side of the switch so as to discharge the liquid to outside the dial.

2. The power seat operation device of claim 1, wherein:
at least one of the dial or the knob includes a reinforcement rib inside the dial that projects in a seat width direction; and
the channel is formed using the reinforcement rib.

3. The power seat operation device of claim 2, wherein:
the knob includes a pair of knob reinforcement ribs to serve as the reinforcement rib that projects in the seat width direction;
the pair of knob reinforcement ribs extend from an operation portion side of the knob toward an opposite side from the operation portion; and
the channel includes an outer channel that is formed using the pair of knob reinforcement ribs between a wall portion at a seat width direction outer side of the dial and the knob.

4. The power seat operation device of claim 3, wherein:
the knob includes a pair of stoppers that face each other in their own rotation direction across the operation portion, the pair of stoppers abutting the dial so as to restrict a rotation range with respect to the dial; and
the pair of stoppers guide, to the outer channel, any liquid that has infiltrated into the dial through the opening.

5. The power seat operation device of claim 2, wherein:
the dial includes a dial reinforcement rib between the opening and the switch to serve as the reinforcement rib that projects from a wall portion at a seat width direction inner side toward a seat width direction outer side; and
the channel includes an inner channel that is formed using the dial reinforcement rib between the seat width direction inner side wall portion of the dial and the knob.

6. The power seat operation device of claim 5, wherein:
the dial reinforcement rib extends along a radial direction of the dial from one portion to another portion at an outer periphery of the dial, and forms a convex shape on an opening side at a radial direction central side of the dial.

7. A power seat comprising:
a seat body provided with the plurality of moving mechanisms; and
the power seat operation device according to claim 1, the dial being rotatably installed to a side face of the seat body.

* * * * *